(12) United States Patent
Velichko

(10) Patent No.: US 12,526,545 B2
(45) Date of Patent: Jan. 13, 2026

(54) IMAGE SENSORS WITH EXTENDED DYNAMIC RANGE

(71) Applicant: SEMICONDUCTOR COMPONENTS INDUSTRIES, LLC, Scottsdale, AZ (US)

(72) Inventor: Sergey Velichko, Boise, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 166 days.

(21) Appl. No.: 18/360,972

(22) Filed: Jul. 28, 2023

(65) Prior Publication Data

US 2024/0259705 A1 Aug. 1, 2024

Related U.S. Application Data

(60) Provisional application No. 63/481,860, filed on Jan. 27, 2023.

(51) Int. Cl.
*H04N 25/59* (2023.01)
*H04N 25/571* (2023.01)
*H04N 25/771* (2023.01)
*H04N 25/78* (2023.01)

(52) U.S. Cl.
CPC ........... *H04N 25/59* (2023.01); *H04N 25/571* (2023.01); *H04N 25/771* (2023.01); *H04N 25/78* (2023.01)

(58) Field of Classification Search
CPC .... H04N 25/59; H04N 25/571; H04N 25/771; H04N 25/78
See application file for complete search history.

(56) References Cited

U.S. PATENT DOCUMENTS

| | | |
|---|---|---|
| 9,247,170 B2 | 1/2016 | Komori et al. |
| 10,110,840 B2 | 10/2018 | Velichko |
| 10,313,613 B2 | 6/2019 | Velichko |
| 10,791,292 B1 | 9/2020 | Geurts |
| 11,348,956 B2 | 5/2022 | Choi et al. |
| 11,722,794 B2 | 8/2023 | Innocent et al. |
| 11,729,526 B1 | 8/2023 | Choi |

(Continued)

FOREIGN PATENT DOCUMENTS

| | | |
|---|---|---|
| EP | 4109889 A1 | 12/2022 |
| EP | 4307705 A1 | 1/2024 |

*Primary Examiner* — Nicholas G Giles
(74) *Attorney, Agent, or Firm* — Treyz Law Group, P.C.; Jason Tsai

(57) ABSTRACT

An image sensor may include an array of imaging pixels arranged in rows and columns. A method of operating an imaging pixel is provided that includes accumulating charge in a photosensitive element, allowing the accumulated charge in the photodiode to overflow into a capacitor that is coupled to a reset transistor having a gate terminal configured to receive a reset control signal during an integration phase, and extending the dynamic range of the imaging pixel by dynamically adjusting the reset control signal from a first voltage level to a second voltage level during the integration phase. The reset control signal can be lowered from the first voltage level to the second voltage level in a discrete or continuous fashion such that a portion of the overflow charge in the capacitor represents a linear signal and a portion of the overflow charge in the capacitor represents a non-linear signal.

17 Claims, 13 Drawing Sheets

(56) References Cited

U.S. PATENT DOCUMENTS

| | | |
|---|---|---|
| 11,736,833 B1 | 8/2023 | Choi |
| 2019/0124278 A1 | 4/2019 | Velichko |
| 2020/0154066 A1 | 5/2020 | Johnson |
| 2020/0227454 A1* | 7/2020 | Geurts .................. H10F 39/199 |
| 2021/0112212 A1 | 4/2021 | Oh |

* cited by examiner

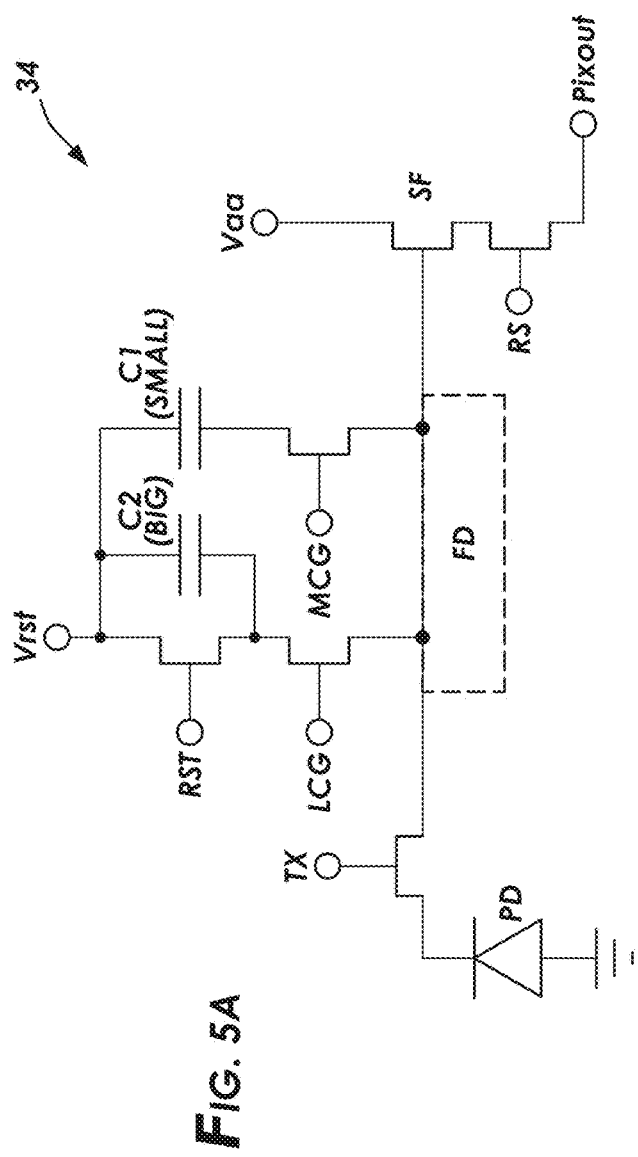
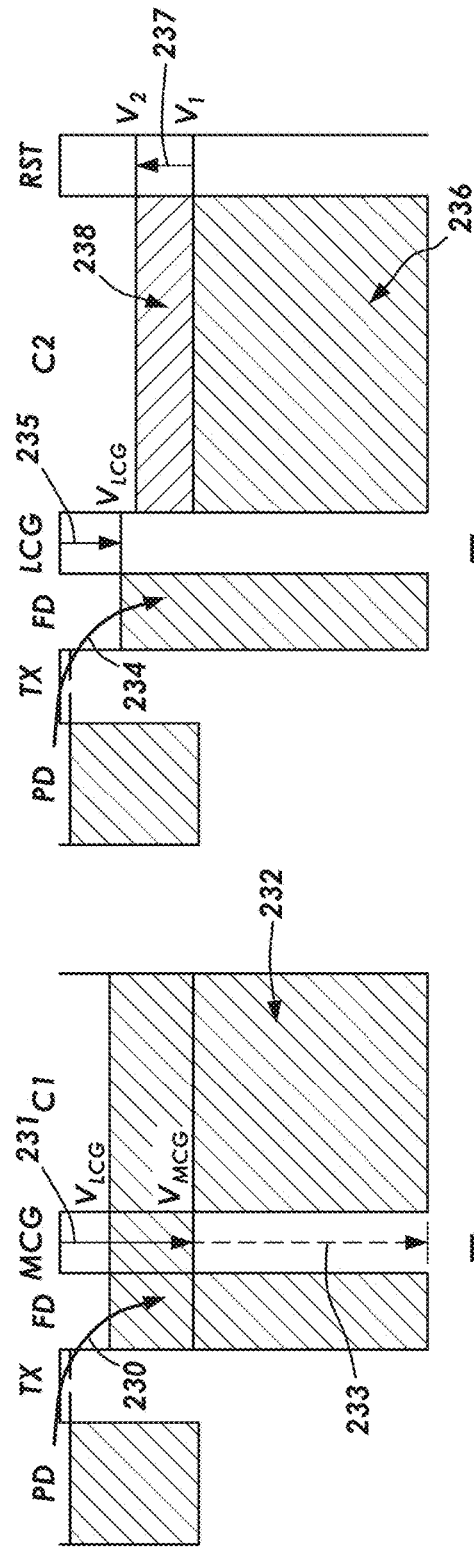
FIG. 5A
FIG. 5B
FIG. 5C

IMAGE SENSORS WITH EXTENDED DYNAMIC RANGE

BACKGROUND

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

It is within this context that the embodiments described herein arise.

BRIEF DESCRIPTION OF THE DRAWINGS

FIG. 5A is a circuit diagram of an illustrative 6-transistor (6T) image pixel in accordance with some embodiments.

FIG. 5B is a potential diagram illustrating charge levels associated with a first capacitor of the 6T image pixel shown in FIG. 5A during integration in accordance with some embodiments.

FIG. 5C is a potential diagram illustrating charge levels associated with a second capacitor of the 6T image pixel shown in FIG. 5A during integration in accordance with some embodiments.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds or thousands or millions of pixels (e.g., megapixels). Image sensors may include control circuitry such as circuitry for operating the pixels and readout circuitry for reading out image signals corresponding to the electric charge generated by the photosensitive elements.

Figure 1:
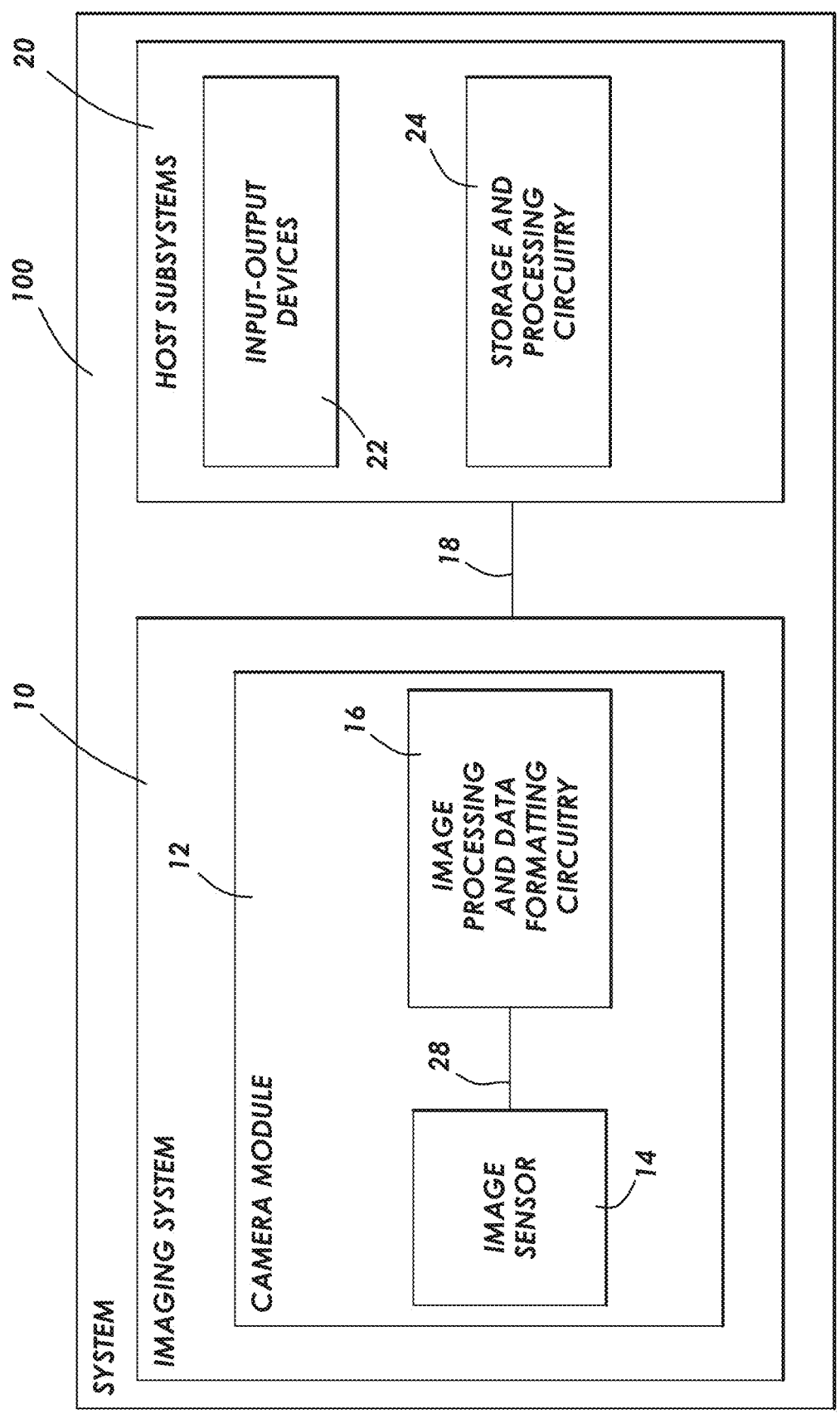
FIG. 1 is a diagram of an illustrative electronic device having an image sensor in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), may be a surveillance system, or part of an automated self-driving system.

As shown in FIG. 1, system 100 may include an imaging system such as imaging system 10 and host subsystems such as host subsystem 20. Imaging system 10 may include camera module 12. Camera module 12 may include one or more image sensors 14, such as in an image sensor array integrated circuit, and one or more lenses.

During image capture operations, each lens may focus light onto an associated image sensor 14. Image sensor 14 may include photosensitive elements (i.e., image sensor pixels) that convert the light into analog data. Image sensors may have any number of pixels (e.g., hundreds, thousands, millions, or more). A typical image sensor may, for example, have millions of pixels (e.g., megapixels).

Each image sensor in camera module 12 may be identical or there may be different types of image sensors in a given image sensor array integrated circuit. In some examples, image sensor 14 may further include bias circuitry (e.g., source follower load circuits), sample and hold circuitry, correlated double sampling (CDS) circuitry, amplifier circuitry, data output circuitry, memory (e.g., buffer circuitry), and/or address circuitry.

Still and video image data from sensor 14 may be provided to image processing and data formatting circuitry 16 via path 28. Image processing and data formatting circuitry 16 may be used to perform image processing functions such as data formatting, adjusting white balance and exposure, implementing video image stabilization, and/or face detection. Image processing and data formatting circuitry 16 may additionally or alternatively be used to compress raw camera image files if desired (e.g., to Joint Photographic Experts Group or JPEG format).

In one example arrangement, such as a system on chip (SoC) arrangement, sensor 14 and image processing and data formatting circuitry 16 are implemented on a common semiconductor substrate (e.g., a common silicon image sensor integrated circuit die). If desired, sensor 14 and image processing circuitry 16 may be formed on separate semiconductor substrates. For example, sensor 14 and image processing circuitry 16 may be formed on separate substrates that have been stacked.

Imaging system 10 may convey acquired image data to host subsystem 20 over path 18. Host subsystem 20 may include input-output devices 22 and storage processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of the imaging system 10 may communicate the acquired image data to storage and processing circuitry 24 of the host subsystems 20.

If desired, system 100 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, solid-state drives, etc.). Storage and processing circuitry 24 may additionally or alternatively include microprocessors, microcontrollers, digital signal processors, and/or application specific integrated circuits.

Figure 2:
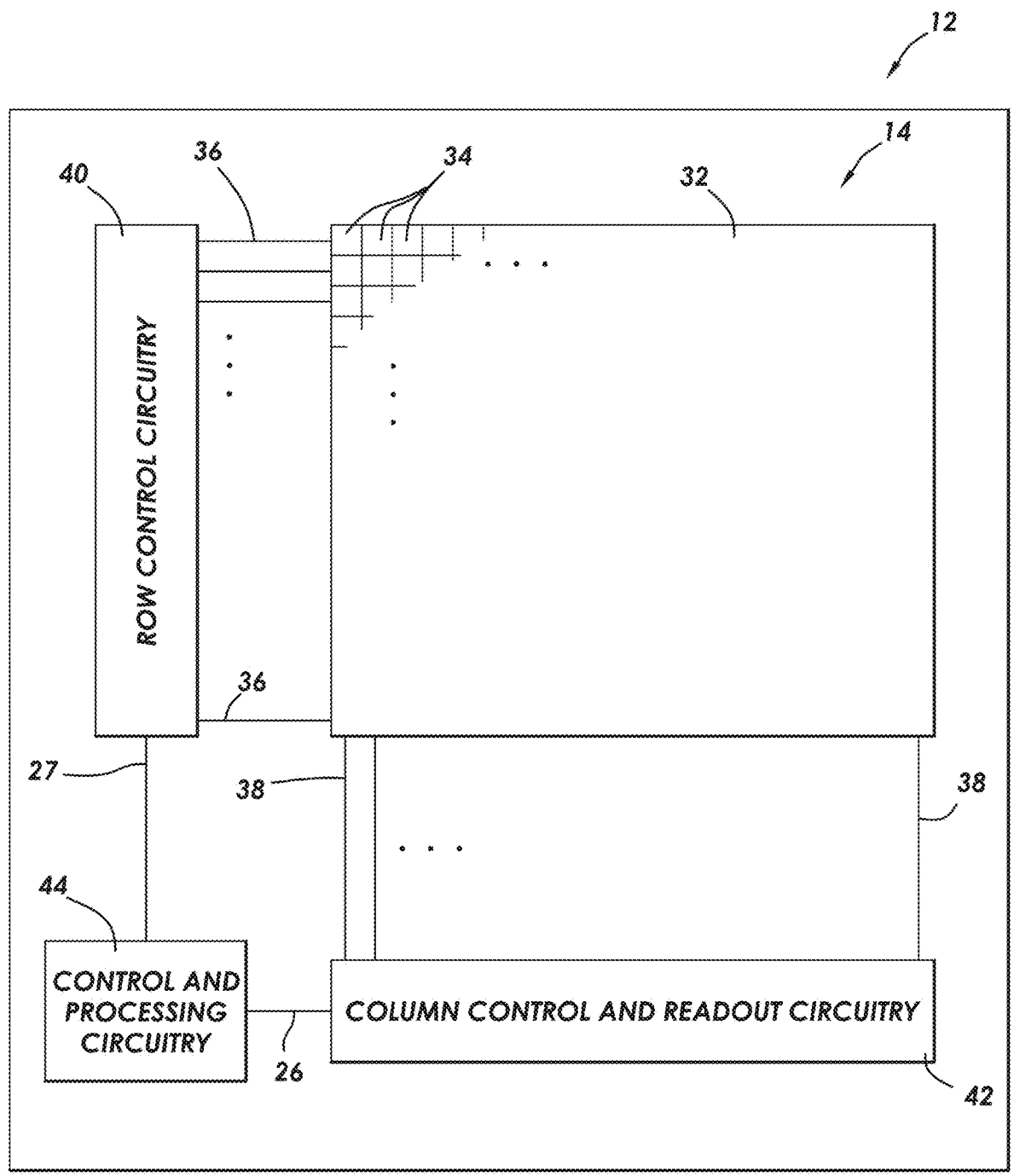
FIG. 2 is a diagram of an illustrative pixel array and associated row and column control circuitry for reading out image signals from an image sensor in accordance with some embodiments.

An example of an arrangement of image sensor 14 of FIG. 1 is shown in FIG. 2. As shown in FIG. 2, image sensor 14 may include control and processing circuitry 44. Control and processing circuitry 44 (sometimes referred to as control and processing logic) may be part of image processing and data formatting circuitry 16 in FIG. 1 or may be separate from circuitry 16. Image sensor 14 may include a pixel array such as array 32 of pixels 34 (sometimes referred to herein as image sensor pixels, imaging pixels, or image pixels). Control and processing circuitry 44 may be coupled to row control circuitry 40 via control path 27 and may be coupled to column control and readout circuitry 42 via data path 26.

Row control circuitry 40 may receive row addresses from control and processing circuitry 44 and may supply corresponding row control signals to image pixels 34 over one or more control paths 36. The row control signals may include pixel reset control signals, charge transfer control signals, blooming control signals, row select control signals, dual conversion gain control signals, or any other desired row pixel control signals.

Column control and readout circuitry 42 may be coupled to one or more of the columns of pixel array 32 via one or more conductive lines such as column lines 38. A given column line 38 may be coupled to a column of image pixels 34 in image pixel array 32 and may be used for reading out image signals from image pixels 34 and for supplying bias signals (e.g., bias currents or bias voltages) to image pixels 34. In some examples, each column of pixels may be coupled to a corresponding column line 38. For image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 can optionally include column circuitry such as column amplifiers for amplifying signals read out from array 32, sample and hold circuitry for sampling and storing signals read out from array 32, analog-to-digital converter circuits for converting read out analog signals to corresponding digital signals, and/or column memory for storing the readout signals and any other desired data. Column control and readout circuitry 42 may output digital pixel readout values to control and processing logic 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure. Features described herein as rows may be arranged vertically and features described herein as columns may be arranged horizontally. The terms "row" and "column" referring to different dimensions of array 32 can sometimes be used interchangeably.

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another example, broadband image pixels having broadband color filter elements (e.g., clear color filter elements) may be used instead of green pixels in a Bayer pattern. These examples are merely illustrative and, in general, color filter elements of any desired color (e.g., cyan, yellow, red, green, blue, etc.) and in any desired pattern may be formed over any desired number of image pixels 34.

Conventional image pixels are sometimes provided with an overflow capacitor to help increase the dynamic range of the image sensor. Such image pixels, however, require relatively large overflow capacitors to provide the desired dynamic range and flicker-free performance. It can therefore be challenging to design small image sensor pixels with the requisite dynamic range and flicker-free and motion-artifact-free performance.

Figure 3A:
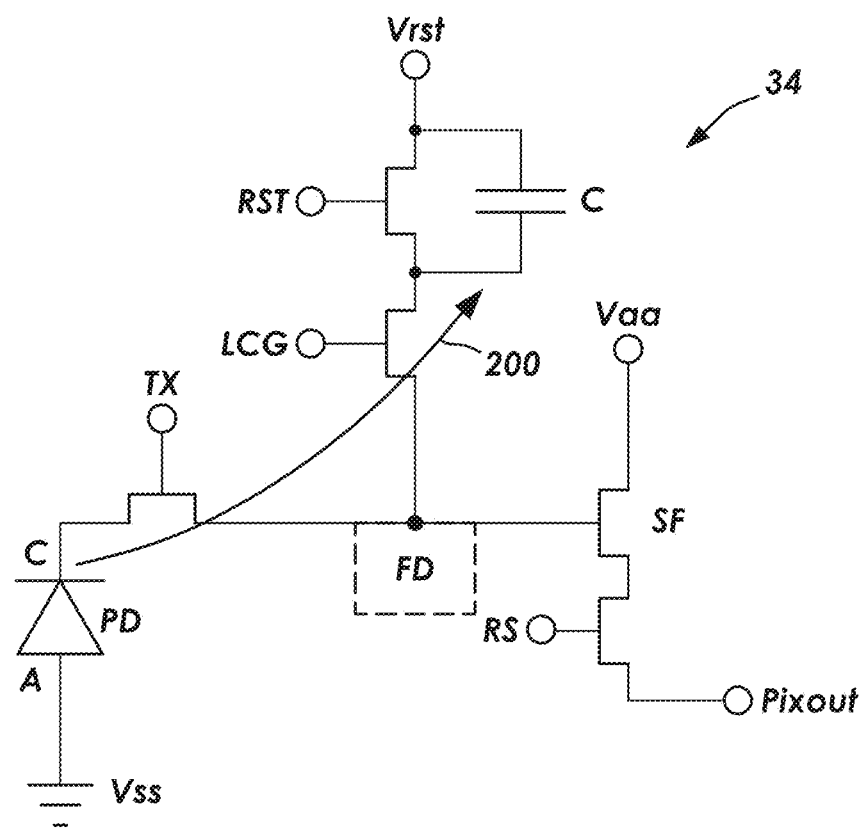
FIG. 3A is a circuit diagram of an illustrative 5-transistor (5T) image pixel in accordance with some embodiments.

In accordance with an embodiment, FIG. 3A is a circuit diagram of an illustrative image sensor pixel 34 that can be operated to provide more than 140 dB of flicker-free and motion-artifact-free high dynamic range (HDR) performance. As shown in FIG. 3A, image sensor pixel 34 can include a photosensitive element such as photodiode PD, a charge transfer switch such as charge transfer transistor TX, a floating diffusion region represented by floating diffusion node FD, a source follower switch such as source follower transistor SF, a row selection switch such as row select transistor RS, a reset switch such as reset transistor RST, a conversion gain switch such as low conversion gain transistor LCG, and a capacitor such as capacitor C.

Photodiode PD may have an anode terminal coupled to a ground power supply line on which ground voltage Vss is provided and a cathode terminal coupled to floating diffusion node FD via charge transfer transistor TX. The charge transfer transistor TX may have a gate terminal configured to receive a charge transfer control signal that is selectively asserted to turn on or activate transistor TX and that is selectively deasserted to turn off or deactivate transistor TX. The term "activate" with respect to a switch (or transistor) may refer to or be defined herein as an action that places the switch in an on or low-impedance state such that the two terminals of the switch are electrically connected to conduct current. The term "deactivate" with respect to a switch (or transistor) may refer to or be defined herein as an action that places the switch in an off or high-impedance state such that the two terminals of the switch/transistor are electrically disconnected with minimal leakage current.

The source follower transistor SF may have a gate terminal coupled to floating diffusion node FD, a drain terminal coupled to positive power supply voltage Vaa, and a source terminal coupled to the pixel output line Pixout via row select transistor RS. The row select transistor RS may have a gate terminal configured to receive a row selection signal that is selectively asserted to turn on or activate transistor RS and that is selectively deasserted to turn off or deactivate transistor RS. The pixel output line Pixout may represent a column line such as column line 38 shown in FIG. 2. The terms "source" and "drain" are sometimes used interchangeably when referring to current-conducting terminals of a metal-oxide-semiconductor transistor. The source and drain terminals are therefore sometimes referred to as "source-drain" terminals (e.g., a transistor has a gate terminal, a first source-drain terminal, and a second source-drain terminal).

The low conversion gate transistor LCG may have a source terminal coupled to floating diffusion node FD, a gate terminal configured to receive a (low) gain mode control signal, and a drain terminal coupled to reset transistor RST. The gain mode control signal can be selectively asserted to activate transistor LCG and selectively deasserted to deactivate transistor LCG. The reset transistor RST may have a source terminal coupled to the drain terminal transistor LCG, a gate terminal configured to receive a reset control signal, and a drain terminal configured to receive a reset voltage Vrst. The reset control signal can be selectively asserted to activate transistor RST and selectively deasserted to deactivate transistor RST. Capacitor C can have a first terminal coupled to the source terminal of transistor RST and a second terminal coupled to the drain terminal of transistor RST. If desired, pixel 34 of FIG. 3A can have more than five transistors and more than one capacitor or can have fewer than five transistors.

Figure 3B:
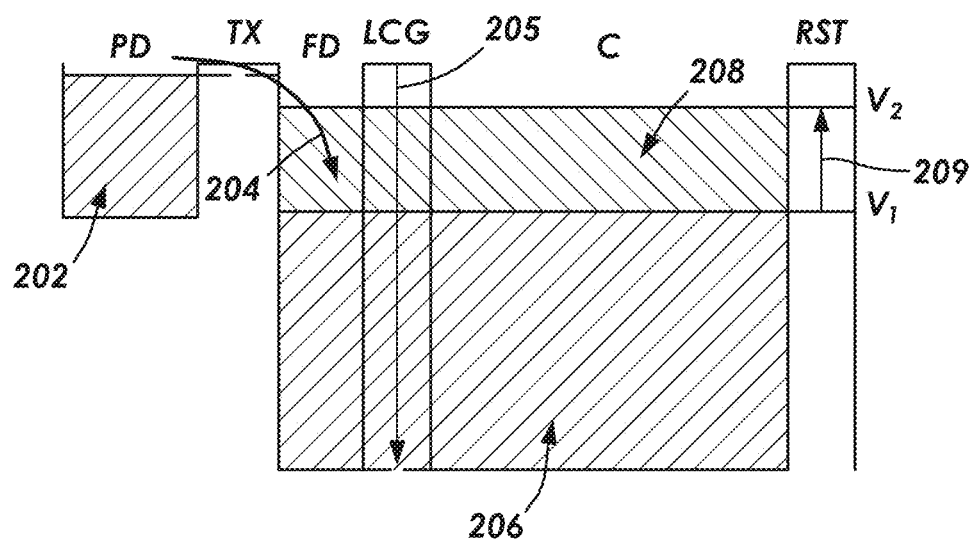
FIG. 3B is a potential diagram illustrating charge levels in the 5T image pixel shown in FIG. 3A during an integration phase in accordance with some embodiments.

FIG. 3B is a potential diagram illustrating charge levels in the 5-transistor (5T) image pixel 34 of the type described in connection with FIG. 3A during an integration phase. The integration phase is sometimes referred to as integration time, integration period, or integration with a fixed or adjustable duration. As shown in FIG. 3B, charge 202 can accumulate in photodiode PD in response to impinging photons. Excess charge 202 generated by photodiode PD can overflow into floating diffusion region FD even while charge transfer transistor TX is deactivated as indicated by the high potential barrier of the TX transistor (see overflow arrow 204). In the context of a potential diagram, a low voltage controlling an active-high gate/switch corresponds to the high(er) potential barrier that blocks transfer of charge, whereas a high voltage corresponds to a low(er) potential barrier that allows transfer of charge. During the integration phase, low conversion gain transistor LCG can be fully activated (see arrow 205) so the overflow charge can fill up both the floating diffusion region FD and capacitor C. This overflowing of charge from photodiode PD to capacitor C via the LCG transistor is also shown in FIG. 3A by arrow 200.

During the integration phase, the reset transistor RST can initially receive a reset control signal with a voltage level set equal to $V_1$. An amount of charge 206 can fill up floating diffusion node FD and capacitor C up to a level that is determined by voltage level $V_1$. Charge 206 may represent a linear overflow signal, where the amount of overflow charge 206 can be determined based on a simple linearization computation using known gain ratios.

In accordance with some embodiments, the voltage of the reset control signal can be dynamically adjusted during the integration phase. For example, The voltage of the reset control signal can be adjusted from first voltage level $V_1$ to a second voltage level $V_2$. The second voltage $V_2$ should be less than the first voltage $V_1$. This is shown in FIG. 3B in which the potential barrier of the reset transistor RST is raised from $V_1$ to $V_2$, as indicated by arrow 209. An additional amount of charge 208 can further fill up floating diffusion region FD and capacitor C as the reset control signal is lowered from $V_1$ to $V_2$. Charge 208 may represent a non-linear overflow signal that might require calibrated linearization. Operating image pixel 34 in this way during integration time can be technically advantageous and beneficial to extend flicker-free and motion-artifact-free HDR performance many times such as from 120 dB to 140 dB or more across a wide range of operating temperatures without incurring large area cost.

Figure 4:
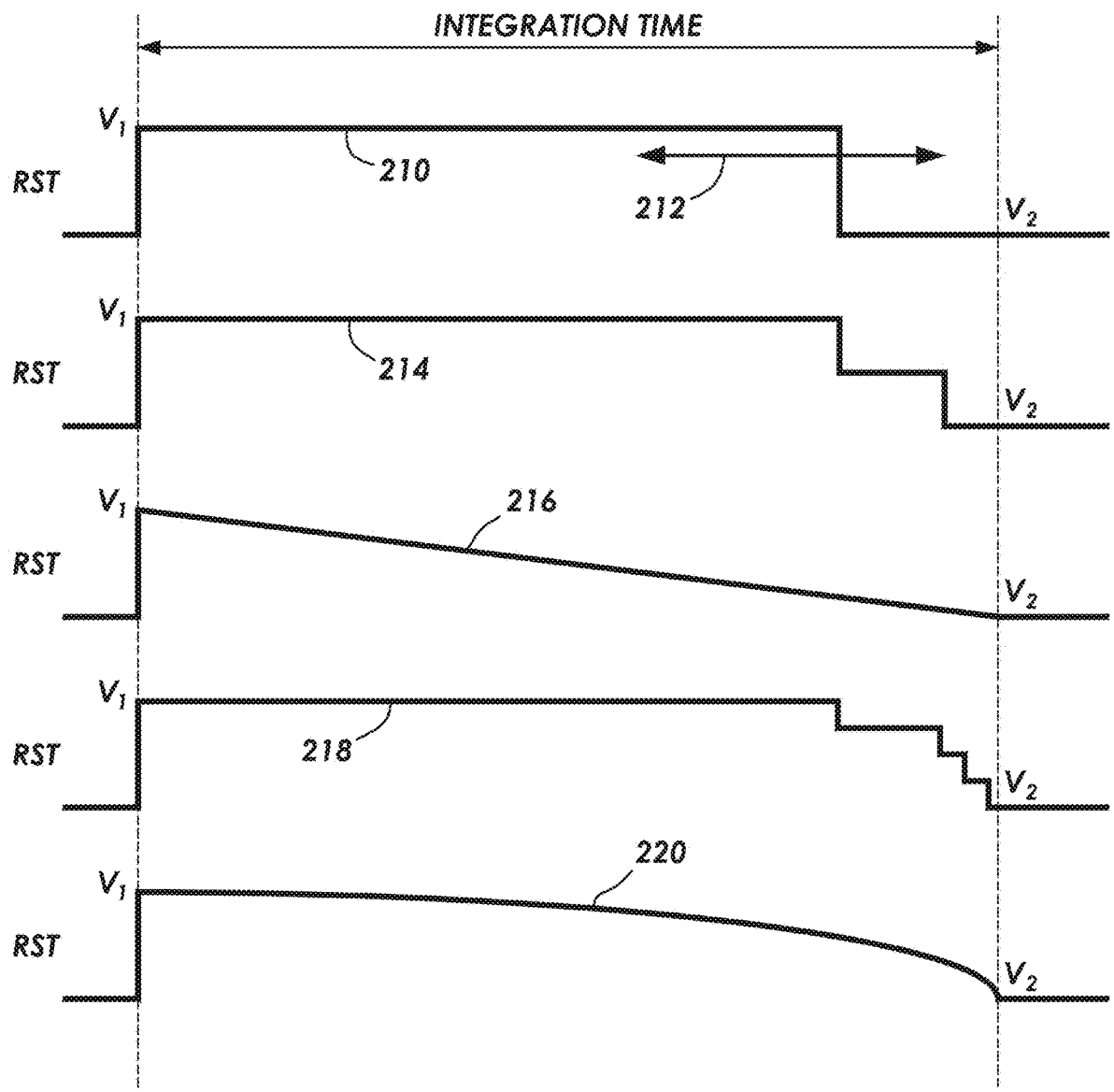
FIG. 4 is a timing diagram illustrating different ways of reducing a reset voltage during the integration phase in accordance with some embodiments.

FIG. 4 is a timing diagram showing how the reset control signal that controls reset transistor RST can be lowered during the integration phase. Waveform 210 shows how the reset control signal can be lowered from first voltage level $V_1$ to second voltage level $V_2$ via a single voltage step. Voltage level $V_2$ may be equal to a ground voltage, 0 V, a negative voltage, or other low voltage. Voltage level $V_1$ may be equal to some voltage between $V_2$ and positive power supply voltage Vaa, Vaa, or other intermediate voltage. During the integration phase, the duration for which the reset control signal is held at $V_1$ can be greater than the duration for which the reset control signal is held at $V_2$. Operated in this way, a majority of the overflow charge in the floating diffusion region FD and capacitor C will be from the linear overflow charge (see charge 206 in FIG. 3B). The duration for which the reset control signal is at $V_1$ and $V_2$ can be adjustable, as indicated by arrow 212. For example, increasing the duration for which the reset control signal is at $V_1$ would decrease the duration for which the reset control signal is at $V_2$, and vice versa. If desired, the duration for which the reset control signal is held at $V_1$ can be equal to or less than the duration for which the reset control signal is held at $V_2$ during integration.

Waveform 210 showing how the reset control signal for transistor RST can be lowered from $V_1$ to $V_2$ via a single voltage step is exemplary. If desired, other ways of reducing the reset control signal in a discrete and/or continuous manner can be employed. Waveform 214 shows another example where the reset control signal for transistor RST is lowered from $V_1$ to $V_2$ via multiple voltage steps. In particular, waveform 214 may step down to one intermediate voltage level before stepping all the way down to $V_2$. Waveform 216 shows another example where the reset control signal is gradually ramped down from voltage level $V_1$ to $V_2$ in a linear fashion. Waveform 218 shows another example where the reset control signal for transistor RST is lowered from $V_1$ to $V_2$ via three intermediate voltage levels before stepping all the way down to $V_2$. Waveform 220 shows yet another example where the reset control signal for transistor RST is gradually lowered from $V_1$ down to $V_2$ in an exponential fashion. The examples of FIG. 4 are illustrative and not intended to limit the scope of the present embodiments.

The embodiment of FIG. 3A in which pixel 34 includes one capacitor is exemplary. FIG. 5A shows another embodiment of image sensor pixel 34 that includes multiple capacitors. As shown in FIG. 5A, image sensor pixel 34 can include a photosensitive element such as photodiode PD, a charge transfer switch such as charge transfer transistor TX, a floating diffusion region represented by floating diffusion node FD, a source follower switch such as source follower transistor SF, a row selection switch such as row select transistor RS, a reset switch such as reset transistor RST, conversion gain switches such as low conversion gain transistor LCG and middle (medium) conversion gain transistor MCG, and capacitors such as capacitors C1 and C2.

Photodiode PD may have an anode terminal coupled to a ground power supply line on which ground voltage Vss is provided and a cathode terminal coupled to floating diffusion node FD via charge transfer transistor TX. The charge transfer transistor TX may have a gate terminal configured to receive a charge transfer control signal that is selectively asserted to turn on or activate transistor TX and that is selectively deasserted to turn off or deactivate transistor TX. The source follower transistor SF may have a gate terminal coupled to floating diffusion node FD, a drain terminal coupled to positive power supply voltage Vaa, and a source terminal coupled to the pixel output line Pixout via row select transistor RS. The row select transistor RS may have a gate terminal configured to receive a row selection signal that is selectively asserted to turn on or activate transistor RS and that is selectively deasserted to turn off or deactivate transistor RS.

The low conversion gate transistor LCG may have a source terminal coupled to floating diffusion node FD, a gate terminal configured to receive a low gain mode control signal, and a drain terminal coupled to reset transistor RST. The low gain mode control signal can be selectively asserted to activate transistor LCG and selectively deasserted to deactivate transistor LCG. The reset transistor RST may have a source terminal coupled to the drain terminal transistor LCG, a gate terminal configured to receive a reset control signal, and a drain terminal configured to receive a reset voltage Vrst. The reset control signal can be selectively asserted to activate transistor RST and selectively deasserted to deactivate transistor RST. Capacitor C2 can have a first terminal coupled to the source terminal of transistor RST and a second terminal coupled to the drain terminal of transistor RST.

The middle conversion gate transistor MCG may have a source terminal coupled to floating diffusion node FD, a gate terminal configured to receive a middle (medium) gain mode control signal, and a drain terminal coupled to the reset voltage Vrst via capacitor C1. The middle gain mode control signal can be selectively asserted to activate transistor MCG and selectively deasserted to deactivate transistor MCG. Connected in this way, transistor MCG and capacitor C1 are said to be coupled in series between the floating diffusion node FD and reset voltage Vrst. If desired, pixel 34 of FIG. 5A can optionally include more than six transistors and more than two capacitors or can optionally have fewer than six transistors.

FIG. 5B is a potential diagram illustrating charge levels associated with capacitor C1 in the 6-transistor (6T) image pixel 34 of the type described in connection with FIG. 5A during an integration phase. As shown in FIG. 5B, excess charge accumulated in photodiode PD in response to impinging photons can overflow into floating diffusion region FD even while charge transfer transistor TX is deactivated as indicated by the high potential barrier of the TX transistor (see overflow arrow 230). During the integration phase, middle conversion gain transistor MCG can be at least partially activated to a voltage level $V_{MCG}$ (see arrow 231) so that the overflow charge can fill up both the floating diffusion region FD and capacitor C1, as shown by charge 232. This is exemplary. If desired, middle conversion gain transistor MCG can be completely activated during the integration time so that the potential barrier of the MCG switch is dropped all the way down as shown by arrow 233. All of the charge 232 being stored in C1 in this way may represent a linear overflow signal, where the amount of overflow charge 232 can be determined based on a simple linearization computation using known gain ratios.

FIG. 5C is a potential diagram illustrating charge levels associated with capacitor C2 in the 6-transistor (6T) image pixel 34 of the type described in connection with FIG. 5A during the integration phase. As shown in FIG. 5C, excess charge accumulated in photodiode PD in response to impinging photons can overflow into floating diffusion region FD even while charge transfer transistor TX is deactivated as indicated by the high potential barrier of the TX transistor (see overflow arrow 234). During the integration phase, low conversion gain transistor LCG can be partially activated to a voltage level $V_{LCG}$ (see arrow 235) so that the overflow charge can fill up both the floating diffusion region FD and capacitor C2, as shown by charge 236. Here, voltage level $V_{LCG}$ is set less than $V_{MCG}$, so capacitor C1 will fill up first before capacitor C2. During the integration phase, the reset transistor RST can initially receive a reset control signal with a voltage level set equal to $V_1$. The amount of charge 236 overflowing into floating diffusion node FD and capacitor C2 fills up to a level that is determined by voltage level $V_1$. Charge 236 may represent a linear overflow signal, where the amount of overflow charge 236 can be determined based on a simple linearization computation using known gain ratios.

In accordance with some embodiments, the voltage of the reset control signal can be dynamically adjusted during the integration phase. For example, The voltage of the reset control signal can be adjusted from first voltage level $V_1$ to second voltage level $V_2$ in various ways as shown by the examples of FIG. 4. This is also illustrated in FIG. 5C in which the potential barrier of the reset transistor RST is raised from $V_1$ to $V_2$, as indicated by arrow 237. An additional amount of charge 238 can further fill up capacitor C2 as the reset control signal is lowered from $V_1$ to $V_2$. Charge 238 may represent a non-linear overflow signal that might require calibrated linearization. Operating image pixel 34 in this way during integration time can be technically advantageous and beneficial to extend flicker-free and motion-artifact-free HDR performance from 120 dB to 140 dB or more across a wide range of operating temperatures without incurring large area cost.

Figure 6A:
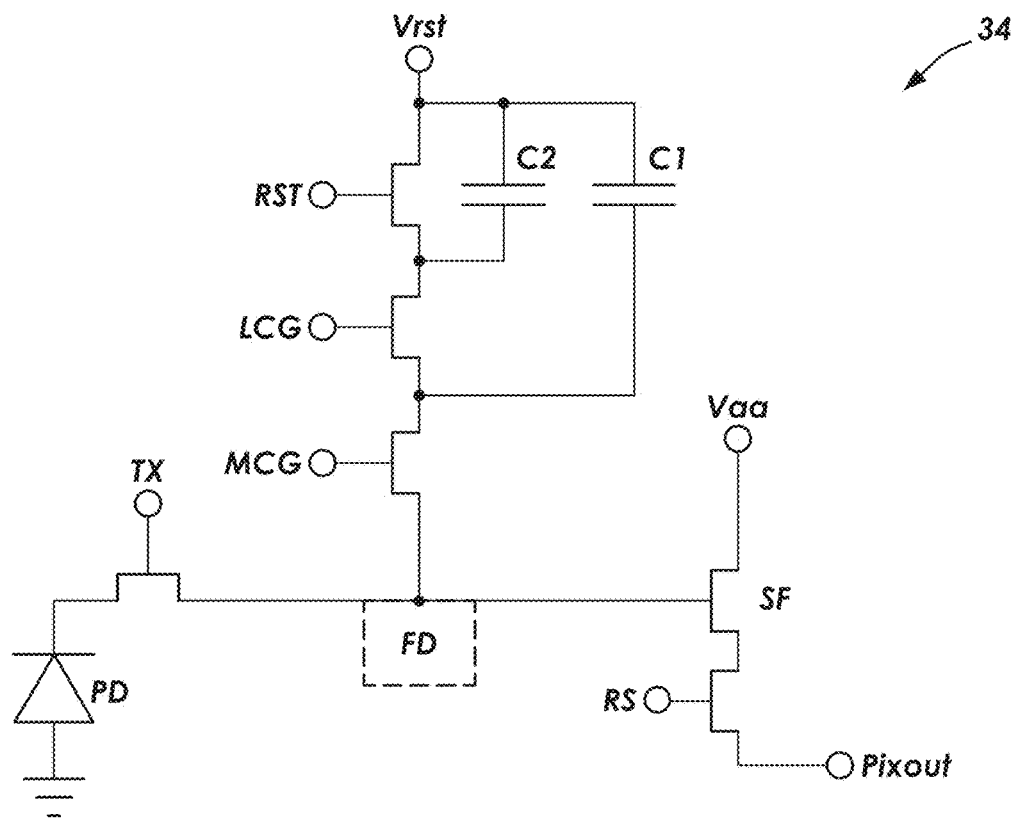
FIG. 6A is a circuit diagram of an illustrative 6T image pixel having two capacitors in accordance with some embodiments.

The embodiment of FIG. 5A in which the LCG and MCG transistors are both directly coupled to floating diffusion node FD is exemplary. FIG. 6A shows another embodiment of image sensor pixel 34 where the LCG and MCG transistors are coupled in series. As shown in FIG. 6A, image sensor pixel 34 can include a photosensitive element such as photodiode PD, a charge transfer switch such as charge transfer transistor TX, a floating diffusion region represented by floating diffusion node FD, a source follower switch such as source follower transistor SF, a row selection switch such as row select transistor RS, a reset switch such as reset transistor RST, conversion gain switches such as low conversion gain transistor LCG and middle (medium) conversion gain transistor MCG, and capacitors such as capacitors C1 and C2.

Photodiode PD may have an anode terminal coupled to a ground power supply line on which ground voltage Vss is provided and a cathode terminal coupled to floating diffusion node FD via charge transfer transistor TX. The charge transfer transistor TX may have a gate terminal configured to receive a charge transfer control signal that is selectively asserted to turn on or activate transistor TX and that is selectively deasserted to turn off or deactivate transistor TX. The source follower transistor SF may have a gate terminal coupled to floating diffusion node FD, a drain terminal coupled to positive power supply voltage Vaa, and a source terminal coupled to the pixel output line Pixout via row select transistor RS. The row select transistor RS may have a gate terminal configured to receive a row selection signal that is selectively asserted to turn on or activate transistor RS and that is selectively deasserted to turn off or deactivate transistor RS.

The middle conversion gate transistor MCG may have a source terminal coupled to floating diffusion node FD, a gate terminal configured to receive a middle gain mode control signal, and a drain terminal. The middle gain mode control signal can be selectively asserted to activate transistor MCG and selectively deasserted to deactivate transistor MCG. Capacitor C1 can have a first terminal coupled to the drain terminal of transistor MCG and a second terminal configured to receive reset voltage Vrst. The low conversion gate transistor LCG may have a source terminal coupled to the drain terminal of transistor MCG, a gate terminal configured to receive a low gain mode control signal, and a drain terminal coupled to voltage Vrst via reset transistor RST. The low gain mode control signal can be selectively asserted to activate transistor LCG and selectively deasserted to deactivate transistor LCG. Capacitor C2 can have a first terminal coupled to the drain terminal of transistor LCG and a second terminal configured to receive reset voltage Vrst. Capacitor C2 may be smaller than capacitor C1 to provide better signal-to-noise ratio (SNR) transitions, especially at higher operating temperatures.

The reset transistor RST may have a gate terminal configured to receive a reset control signal that is selectively asserted to activate transistor RST and selectively deasserted to deactivate transistor RST. Connected in this way, transistors MCG and LCG are said to be coupled in series between the floating diffusion node FD and reset transistor RST. If desired, pixel 34 of FIG. 6A can optionally include more than six transistors and more than two capacitors or can optionally have fewer than six transistors.

Figure 6B:
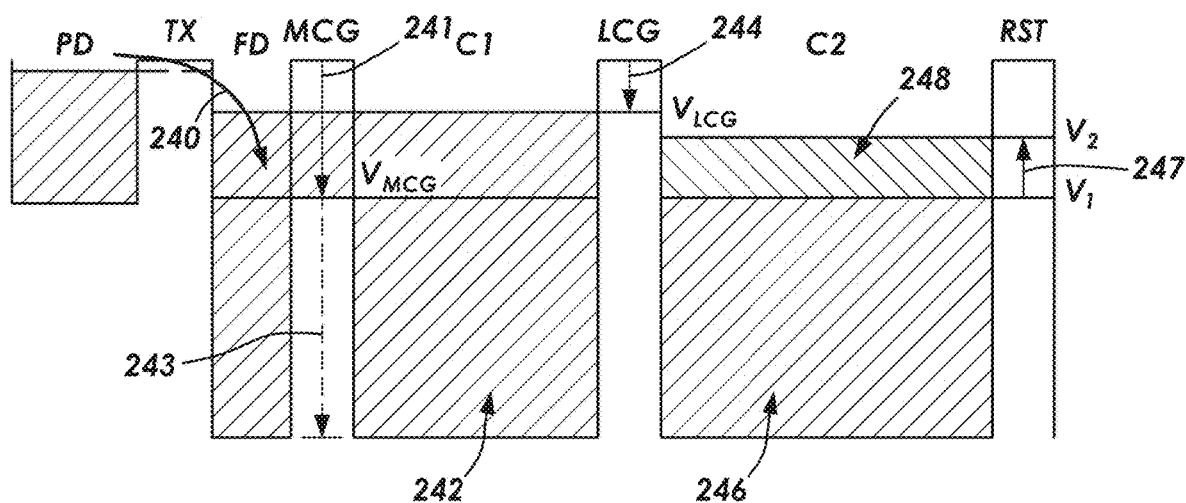
FIG. 6B is a potential diagram illustrating charge levels in the 6T image pixel shown in FIG. 6A during integration in accordance with some embodiments.

FIG. 6B is a potential diagram illustrating charge levels associated the 6T image pixel 34 of the type described in connection with FIG. 6A during an integration phase. As shown in FIG. 6B, excess charge accumulated in photodiode PD in response to impinging photons can overflow into floating diffusion region FD even while charge transfer transistor TX is deactivated or slightly activated (see dotted line), as indicated overflow arrow 240. During the integration phase, middle conversion gain transistor MCG can be at least partially activated to a voltage level $V_{MCG}$ (see arrow 241) so that the overflow charge can fill up both the floating diffusion region FD and capacitor C1, as shown by charge 242. This is exemplary. If desired, middle conversion gain transistor MCG can be completely activated during the integration time so that the potential barrier of the MCG switch is dropped all the way down as shown by arrow 243. All of the charge 242 being stored in C1 in this way may represent a linear overflow signal, where the amount of overflow charge 242 can be determined based on a simple linearization computation using known gain ratios.

During the integration phase, low conversion gain transistor LCG can be partially activated to a voltage level $V_{LCG}$ (see arrow 244) so that the overflow charge from capacitor C1 can then flow into capacitor C2, as shown by charge 246. Here, voltage level $V_{LCG}$ is set less than $V_{MCG}$, so capacitor C1 will fill up first before filling up capacitor C2. During the integration phase, the reset transistor RST can initially receive a reset control signal with a voltage level set equal to $V_1$. The amount of charge 246 overflowing into capacitor C2 fills up to a level that is determined by voltage level $V_1$. Charge 246 may represent a linear overflow signal, where the amount of overflow charge 246 can be determined based on a simple linearization computation using known gain ratios.

In accordance with some embodiments, the voltage of the reset control signal can be dynamically adjusted during the integration phase. For example, The voltage of the reset control signal can be adjusted from first voltage level $V_1$ to second voltage level $V_2$ in various ways as shown by the examples of FIG. 4. This is also illustrated in FIG. 6B in which the potential barrier of the reset transistor RST is raised from $V_1$ to $V_2$, as indicated by arrow 247. An additional amount of charge 248 can further fill up capacitor C2 as the voltage of the reset control signal is lowered from $V_1$ to $V_2$. Charge 248 may represent a non-linear overflow signal that might require calibrated linearization. Operating image pixel 34 in this way during integration time can be technically advantageous and beneficial to extend flicker-free and motion-artifact-free HDR performance from 120 dB to 140 dB or more across a wide range of operating temperatures without incurring large area cost.

Figure 7A:
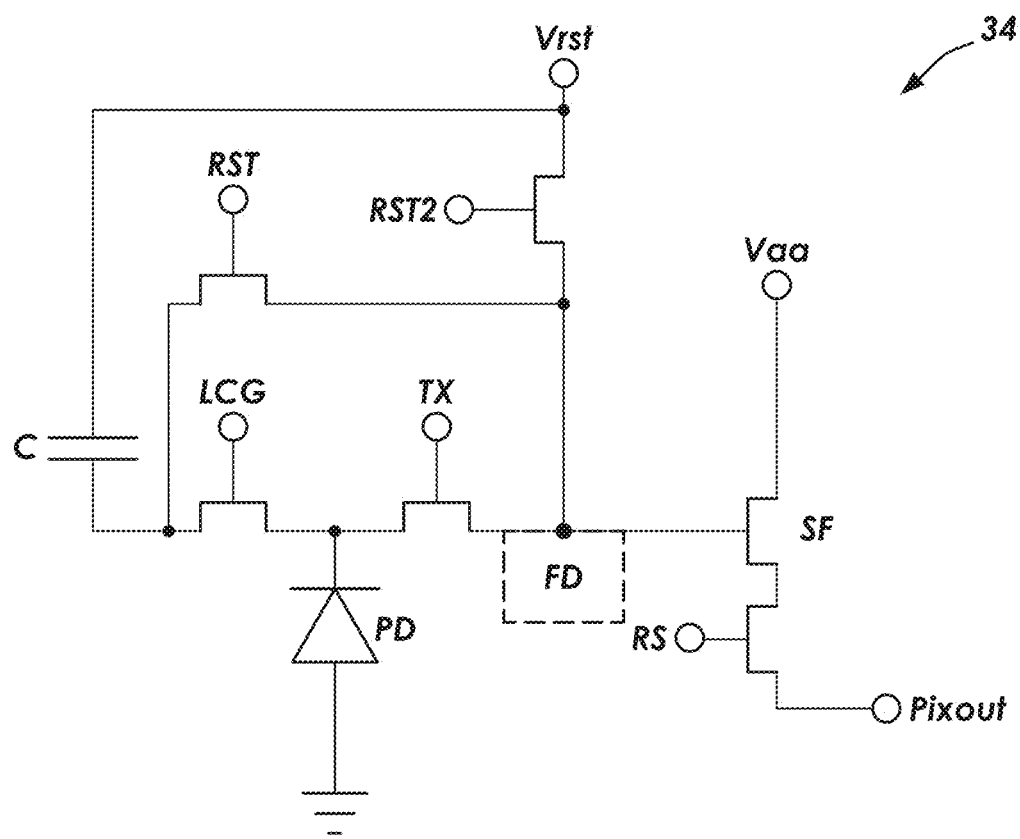
FIG. 7A is a circuit diagram of an illustrative 6T image pixel having a single overflow capacitor in accordance with some embodiments.

The embodiments of FIGS. 3A, 5A, and 6A that include only one reset transistor RST is exemplary. FIG. 7A shows another embodiment of image sensor pixel 34 that includes multiple reset transistors. As shown in FIG. 7A, image sensor pixel 34 can include a photosensitive element such as photodiode PD, a charge transfer switch such as charge transfer transistor TX, a floating diffusion region represented by floating diffusion node FD, a source follower switch such as source follower transistor SF, a row selection switch such as row select transistor RS, reset switches such as reset transistors RST and RST2, a conversion gain switch such as low conversion gain transistor LCG, and a capacitor such as capacitor C.

Photodiode PD may have an anode terminal coupled to a ground power supply line on which ground voltage Vss is provided and a cathode terminal coupled to floating diffusion node FD via charge transfer transistor TX. The charge transfer transistor TX may have a gate terminal configured to receive a charge transfer control signal that is selectively asserted to turn on or activate transistor TX and that is selectively deasserted to turn off or deactivate transistor TX. The source follower transistor SF may have a gate terminal coupled to floating diffusion node FD, a drain terminal coupled to positive power supply voltage Vaa, and a source terminal coupled to the pixel output line Pixout via row select transistor RS. The row select transistor RS may have a gate terminal configured to receive a row selection signal that is selectively asserted to turn on or activate transistor RS and that is selectively deasserted to turn off or deactivate transistor RS.

The low conversion gate transistor LCG may have a source terminal coupled to the cathode terminal of photodiode PD, a gate terminal configured to receive a low gain mode control signal, and a drain terminal. The low gain mode control signal can be selectively asserted to activate transistor LCG and selectively deasserted to deactivate transistor LCG. Capacitor C can have a first terminal coupled to the drain terminal of transistor LCG and a second terminal configured to receive reset voltage Vrst. Reset transistor RST may have a first source-drain terminal coupled to the drain terminal of transistor LCG, a gate terminal configured to receive a first reset control signal, and a second source-drain terminal coupled to the floating diffusion node FD. The first reset control signal can be selectively asserted to activate transistor RST and selectively deasserted to deactivate transistor RST. Reset transistor RST2 may have a source terminal coupled to floating diffusion node FD, a gate terminal configured to receive a second reset control signal, and a drain terminal configured to receive reset voltage Vrst. The second reset control signal can be selectively asserted to activate transistor RST2 and selectively deasserted to deactivate transistor RST2. If desired, pixel 34 of FIG. 7A can optionally include more than six transistors and more than one capacitor or can optionally have fewer than six transistors.

Figure 7B:
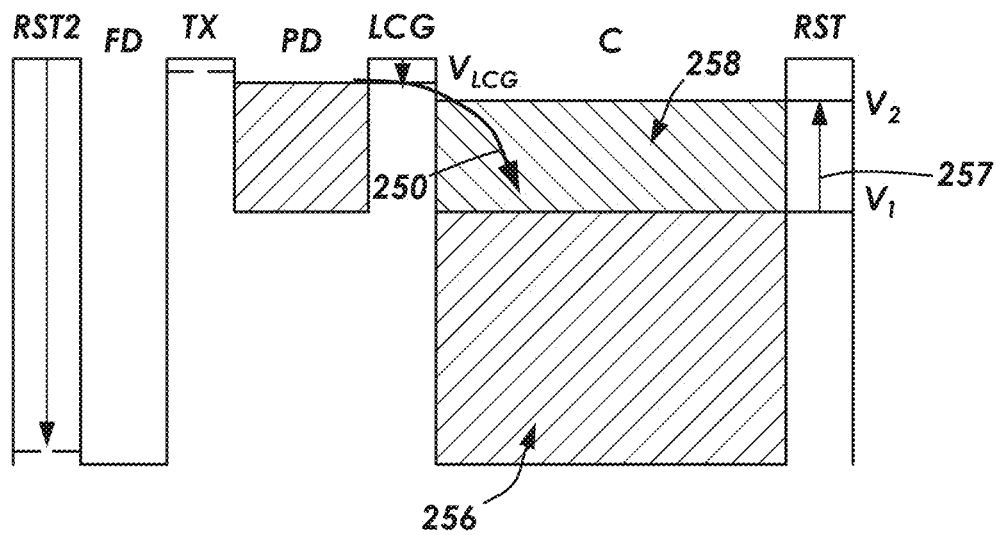
FIG. 7B is a potential diagram illustrating charge levels in the 6T image pixel shown in FIG. 7A during integration in accordance with some embodiments.

FIG. 7B is a potential diagram illustrating charge levels associated the 6T image pixel 34 of the type described in connection with FIG. 7A during an integration phase. As shown in FIG. 7B, excess charge accumulated in photodiode PD in response to impinging photons can overflow into floating diffusion region FD even while charge transfer transistor TX is deactivated as indicated by the high potential barrier of the TX transistor (see overflow arrow 250). During the integration phase, low conversion gain transistor LCG can be partially activated to a voltage level $V_{LCG}$ so that the overflow charge in photodiode PD can flow into capacitor C (see charge 256) and not into floating diffusion region FD. Transistor TX can be completed deactivated while reset transistor RST2 is turned on. During the integration phase, the reset transistor RST can initially receive a first reset control signal with a voltage level set equal to $V_1$. The amount of charge 256 overflowing into capacitor C can fill up to a level that is determined by voltage level $V_1$. Charge 256 may represent a linear overflow signal, where the amount of overflow charge 256 can be determined based on a simple linearization computation using known gain ratios.

In accordance with some embodiments, the voltage of the first reset control signal can be dynamically adjusted during the integration phase. For example, the voltage of the first reset control signal can be adjusted from first voltage level $V_1$ to second voltage level $V_2$ in various ways as shown by the examples of FIG. 4. This is also illustrated in FIG. 7B in which the potential barrier of the reset transistor RST is raised from $V_1$ to $V_2$, as indicated by arrow 257. An additional amount of charge 258 can further fill up capacitor C as the voltage of the first reset control signal is lowered from $V_1$ to $V_2$. Charge 258 may represent a non-linear overflow signal that might require calibrated linearization. Operating image pixel 34 in this way during integration time can be technically advantageous and beneficial to extend flicker-free and motion-artifact-free HDR performance from 120 dB to 140 dB or more across a wide range of operating temperatures without incurring large area cost.

Figure 8A:
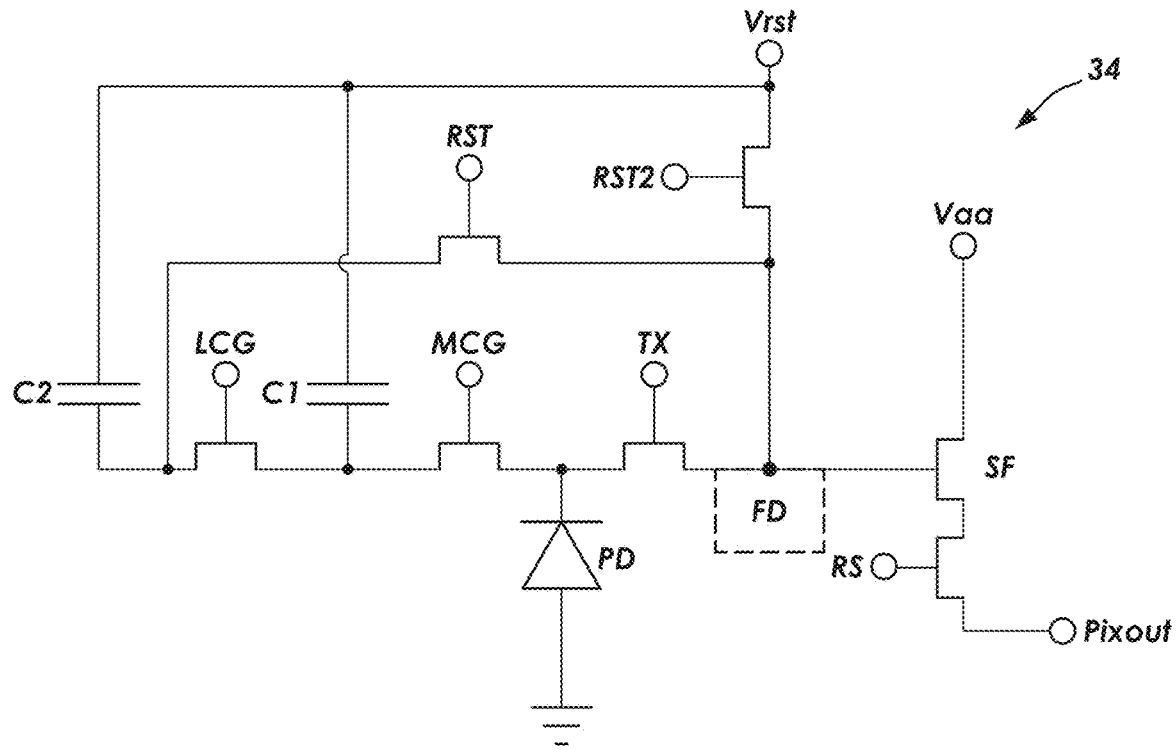
FIG. 8A is a circuit diagram of an illustrative 7-transistor (7T) image pixel in accordance with some embodiments.

The embodiment of FIG. 7A that includes two reset transistors and only one capacitor is exemplary. FIG. 8A shows another embodiment of image sensor pixel 34 that includes multiple reset transistors and multiple capacitors. As shown in FIG. 8A, image sensor pixel 34 can include a photosensitive element such as photodiode PD, a charge transfer switch such as charge transfer transistor TX, a floating diffusion region represented by floating diffusion node FD, a source follower switch such as source follower transistor SF, a row selection switch such as row select transistor RS, reset switches such as reset transistors RST and RST2, conversion gain switches such as low conversion gain transistor LCG and middle (medium) conversion gain transistor MCG, and capacitors such as capacitors C1 and C2.

Photodiode PD may have an anode terminal coupled to a ground power supply line on which ground voltage Vss is provided and a cathode terminal coupled to floating diffusion node FD via charge transfer transistor TX. The charge transfer transistor TX may have a gate terminal configured to receive a charge transfer control signal that is selectively asserted to turn on or activate transistor TX and that is selectively deasserted to turn off or deactivate transistor TX. The source follower transistor SF may have a gate terminal coupled to floating diffusion node FD, a drain terminal coupled to positive power supply voltage Vaa, and a source terminal coupled to the pixel output line Pixout via row select transistor RS. The row select transistor RS may have a gate terminal configured to receive a row selection signal that is selectively asserted to turn on or activate transistor RS and that is selectively deasserted to turn off or deactivate transistor RS.

The middle conversion gate transistor MCG may have first source-drain terminal coupled to the cathode terminal of photodiode PD, a gate terminal configured to receive a middle gain mode control signal, and a second source-drain terminal. The middle gain mode control signal can be selectively asserted to activate transistor MCG and selectively deasserted to deactivate transistor MCG. Capacitor C1 can have a first terminal coupled to the second source-drain terminal of transistor MCG and a second terminal configured to receive reset voltage Vrst. The low conversion gate transistor LCG may have a first source-drain terminal coupled to the second source-drain terminal of transistor MCG, a gate terminal configured to receive a low gain mode control signal, and a second source-drain terminal. The low gain mode control signal can be selectively asserted to activate transistor LCG and selectively deasserted to deactivate transistor LCG. Capacitor C2 can have a first terminal coupled to the second source-drain terminal of transistor LCG and a second terminal configured to receive reset voltage Vrst. Reset transistor RST may have a first source-drain terminal coupled to the second source-drain terminal of transistor LCG, a gate terminal configured to receive a first reset control signal, and a second source-drain terminal coupled to the floating diffusion node FD. The first reset control signal can be selectively asserted to activate transistor RST and selectively deasserted to deactivate transistor RST. Reset transistor RST2 may have a source terminal coupled to floating diffusion node FD, a gate terminal configured to receive a second reset control signal, and a drain terminal configured to receive reset voltage Vrst. The second reset control signal can be selectively asserted to activate transistor RST2 and selectively deasserted to deactivate transistor RST2. If desired, pixel 34 of FIG. 8A can optionally include more than seven transistors and more than two capacitors or can optionally have fewer than seven transistors.

Figure 8B:
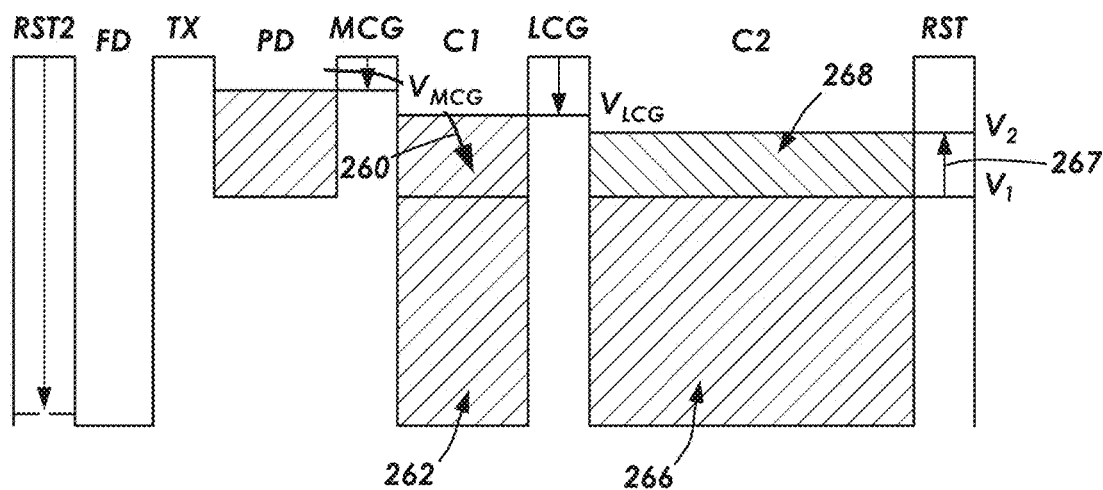
FIG. 8B is a potential diagram illustrating charge levels in the 7T image pixel shown in FIG. 8A during integration in accordance with some embodiments.

FIG. 8B is a potential diagram illustrating charge levels associated the 7T image pixel 34 of the type described in connection with FIG. 8A during an integration phase. As shown in FIG. 8B, excess charge accumulated in photodiode PD in response to impinging photons can overflow into floating diffusion region FD even while charge transfer transistor TX is deactivated as indicated by the high potential barrier of the TX transistor (see overflow arrow 260). During the integration phase, middle conversion gain transistor MCG can be at least partially activated to a voltage level $V_{MCG}$ so that the overflow charge can fill up capacitor C1, as shown by charge 262. This is exemplary. If desired, middle conversion gain transistor MCG can be completely activated during the integration time so that the potential barrier of the MCG switch is dropped all the way down. All of the charge 262 being stored in capacitor C1 in this way may represent a linear overflow signal, where the amount of overflow charge 262 can be determined based on a simple linearization computation using known gain ratios.

During the integration phase, low conversion gain transistor LCG can be partially activated to a voltage level $V_{LCG}$ so that the overflow charge from capacitor C1 can then flow into capacitor C2, as shown by charge 266. Here, voltage level $V_{LCG}$ is set greater than $V_{MCG}$, so capacitor C1 will fill up first before filling up capacitor C2. During the integration phase, the reset transistor RST can initially receive a reset control signal with a voltage level set equal to $V_1$. The amount of charge 266 overflowing into capacitor C2 fills up to a level that is determined by voltage level $V_1$. Charge 266 may represent a linear overflow signal, where the amount of overflow charge 266 can be determined based on a simple linearization computation using known gain ratios.

In accordance with some embodiments, the voltage of the first reset control signal can be dynamically adjusted during the integration phase. For example, the voltage of the first reset control signal can be adjusted from first voltage level $V_1$ to second voltage level $V_2$ in various ways as shown by the examples of FIG. 4. This is also illustrated in FIG. 8B in which the potential barrier of the reset transistor RST is raised from $V_1$ to $V_2$, as indicated by arrow 267. An additional amount of charge 268 can further fill up capacitor C2 as the voltage of the first reset control signal is lowered from $V_1$ to $V_2$. Charge 268 may represent a non-linear overflow signal that might require calibrated linearization. Operating image pixel 34 in this way during integration time can be technically advantageous and beneficial to extend flicker-free and motion-artifact-free HDR performance from 120 dB to 140 dB or more across a wide range of operating temperatures without incurring large area cost.

Figure 9A:
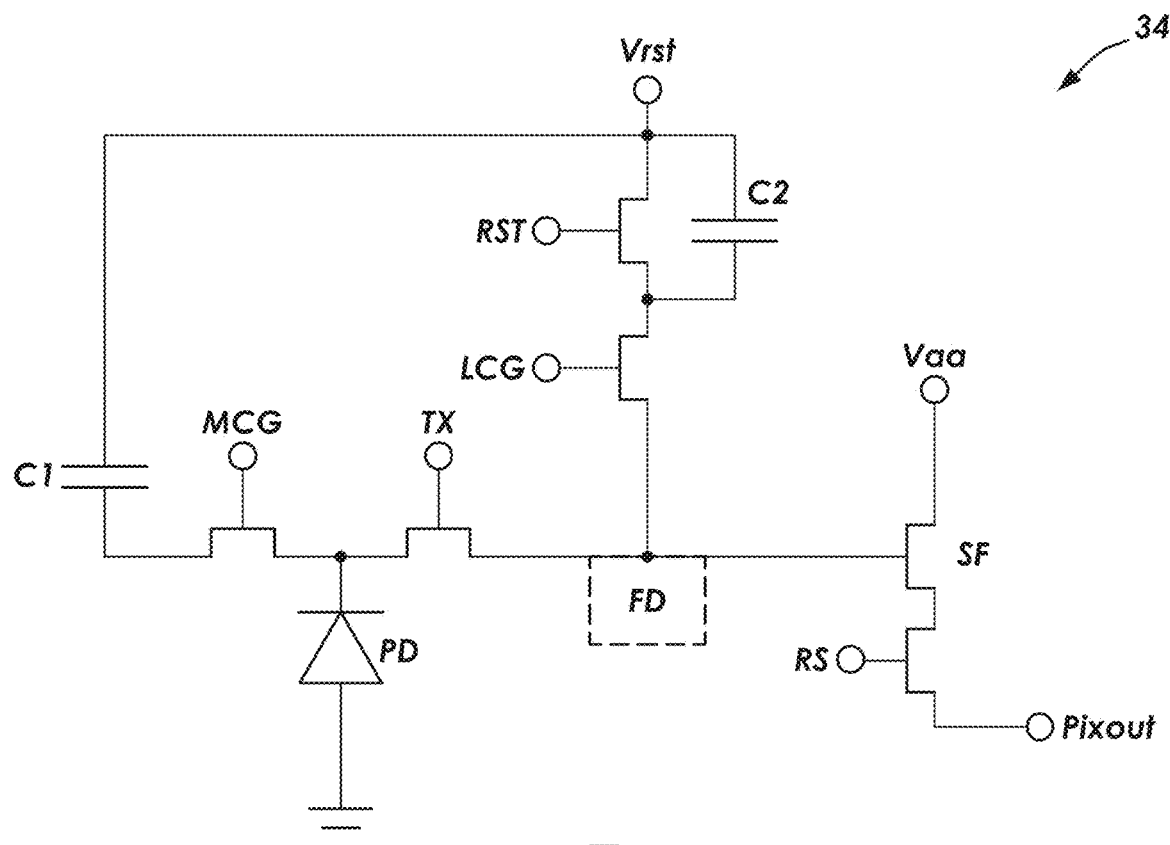
FIG. 9A is a circuit diagram of an illustrative 6T image pixel having two capacitors in accordance with some embodiments.

The embodiment of FIG. 8A in which 7T pixel 34 includes transistors MCG and LCG that are coupled in series is exemplary. FIG. 9A shows another embodiment of image sensor pixel 34 that includes a single reset transistor and multiple capacitors. As shown in FIG. 9A, image sensor pixel 34 can include a photosensitive element such as photodiode PD, a charge transfer switch such as charge transfer transistor TX, a floating diffusion region represented by floating diffusion node FD, a source follower switch such as source follower transistor SF, a row selection switch such as row select transistor RS, a reset switch such as reset transistor RST, conversion gain switches such as low conversion gain transistor LCG and middle (medium) conversion gain transistor MCG, and capacitors such as capacitors C1 and C2.

Photodiode PD may have an anode terminal coupled to a ground power supply line on which ground voltage Vss is provided and a cathode terminal coupled to floating diffusion node FD via charge transfer transistor TX. The charge transfer transistor TX may have a gate terminal configured to receive a charge transfer control signal that is selectively asserted to turn on or activate transistor TX and that is selectively deasserted to turn off or deactivate transistor TX. The source follower transistor SF may have a gate terminal coupled to floating diffusion node FD, a drain terminal coupled to positive power supply voltage Vaa, and a source terminal coupled to the pixel output line Pixout via row select transistor RS. The row select transistor RS may have a gate terminal configured to receive a row selection signal that is selectively asserted to turn on or activate transistor RS and that is selectively deasserted to turn off or deactivate transistor RS.

The middle conversion gate transistor MCG may have first source-drain terminal coupled to the cathode terminal of photodiode PD, a gate terminal configured to receive a middle gain mode control signal, and a second source-drain terminal. The middle gain mode control signal can be selectively asserted to activate transistor MCG and selectively deasserted to deactivate transistor MCG. Capacitor C1 can have a first terminal coupled to the second source-drain terminal of transistor MCG and a second terminal configured to receive reset voltage Vrst.

The low conversion gate transistor LCG may have a first source-drain terminal coupled to floating diffusion node FD, a gate terminal configured to receive a low gain mode control signal, and a second source-drain terminal. The low gain mode control signal can be selectively asserted to activate transistor LCG and selectively deasserted to deactivate transistor LCG. Capacitor C2 can have a first terminal coupled to the second source-drain terminal of transistor LCG and a second terminal configured to receive reset voltage Vrst. Reset transistor RST may have a source terminal coupled to the second source-drain terminal of transistor LCG, a gate terminal configured to receive a reset control signal, and a drain terminal configured to receive Vrst. The reset control signal can be selectively asserted to activate transistor RST and selectively deasserted to deactivate transistor RST. If desired, pixel 34 of FIG. 8A can optionally include more than six transistors and more than two capacitors or can optionally have fewer than six transistors.

Figure 9B:
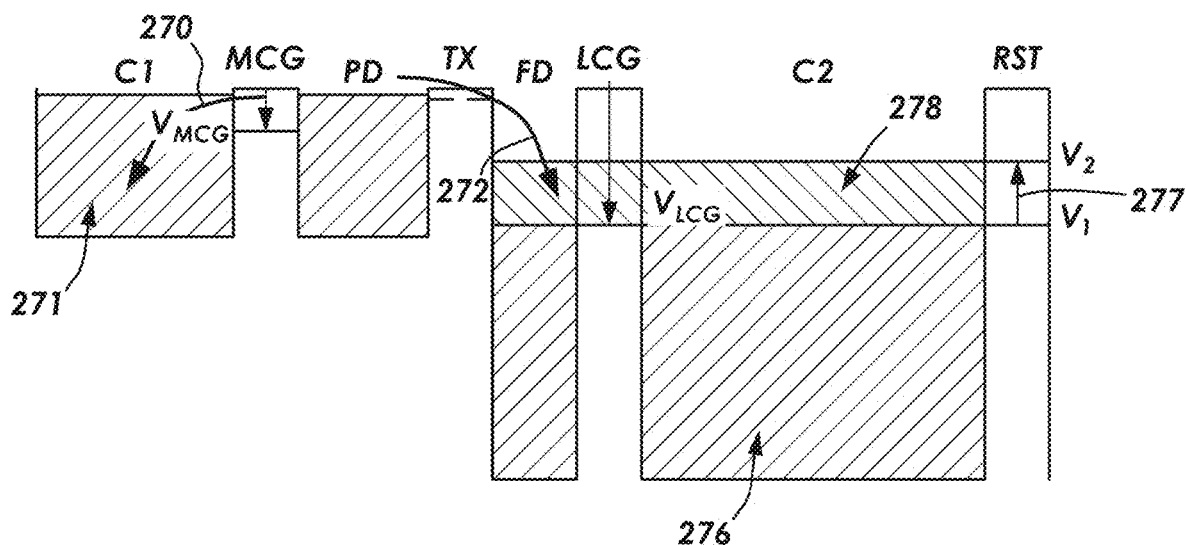
FIG. 9B is a potential diagram illustrating charge levels in the 6T image pixel shown in FIG. 9A during integration in accordance with some embodiments.

FIG. 9B is a potential diagram illustrating charge levels associated the 6T image pixel 34 of the type described in connection with FIG. 9A during an integration phase. As shown in FIG. 9B, charge accumulated in photodiode PD in response to impinging photons can overflow into capacitor C1 via transistor MCG that is partially activated (see overflow array 270). Middle conversion gain transistor MCG can be at least partially activated to a voltage level $V_{MCG}$ so that the overflow charge can fill up capacitor C1, as shown by charge 271. The charge 271 being stored in capacitor C1 in this way may represent a linear overflow signal, where the amount of overflow charge 271 can be determined based on a simple linearization computation using known gain ratios.

Excess charge accumulated in photodiode PD in response to impinging photons can also overflow into floating diffusion region FD even while charge transfer transistor TX is deactivated as indicated by the high potential barrier of the TX transistor (see overflow arrow 272). During the integration phase, low conversion gain transistor LCG can be at least partially activated to a voltage level $V_{LCG}$ so that the overflow charge can fill up capacitor C2, as shown by charge

276. Here, voltage level $V_{LCG}$ is set greater than $V_{MCG}$. This is exemplary. If desired, low conversion gain transistor LCG can be completely activated during the integration time so that the potential barrier of the LCG switch is dropped all the way down. During the integration phase, the reset transistor RST can initially receive a reset control signal with a voltage level set equal to $V_1$. The amount of charge 276 overflowing into capacitor C2 fills up to a level that is determined by voltage level $V_1$. Charge 276 may represent a linear overflow signal, where the amount of overflow charge 276 can be determined based on a simple linearization computation using known gain ratios.

In accordance with some embodiments, the voltage of the reset control signal can be dynamically adjusted during the integration phase. For example, the voltage of the reset control signal can be adjusted from first voltage level $V_1$ to second voltage level $V_2$ in various ways as shown by the examples of FIG. 4. This is also illustrated in FIG. 9B in which the potential barrier of the reset transistor RST is raised from $V_1$ to $V_2$, as indicated by arrow 277. An additional amount of charge 278 can further fill up capacitor C2 as the voltage of the reset control signal is lowered from $V_1$ to $V_2$. Charge 278 may represent a non-linear overflow signal that might require calibrated linearization. Operating image pixel 34 in this way during integration time can be technically advantageous and beneficial to extend flicker-free and motion-artifact-free HDR performance from 120 dB to 140 dB or more across a wide range of operating temperatures without incurring large area cost.

Figure 10:
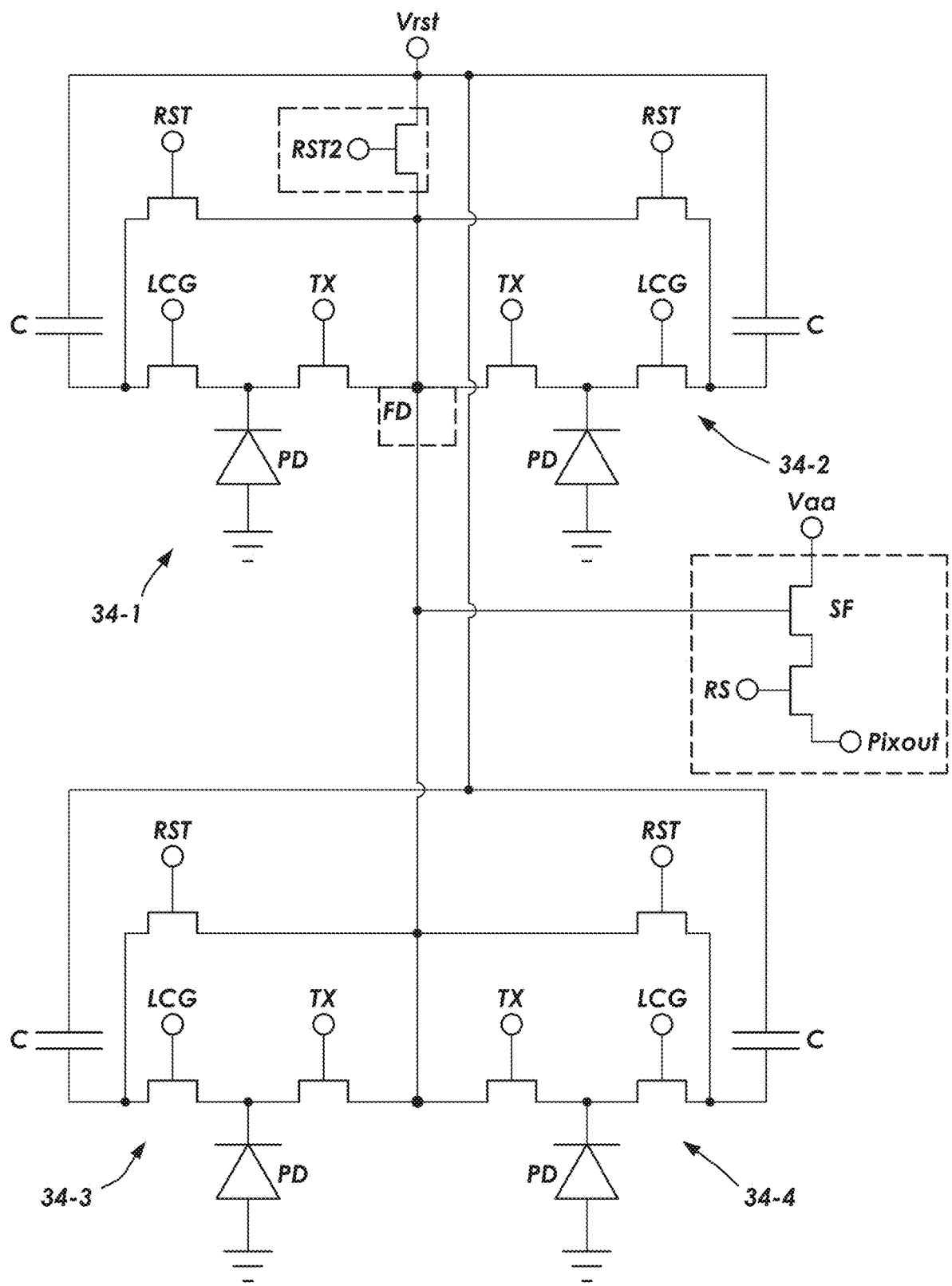
FIG. 10 is a circuit diagram showing how multiple pixel structures of the type shown in FIG. 7A can share readout and reset transistors in accordance with some embodiments.

The embodiment of FIG. 7A in which pixel 34 includes one photodiode PD is exemplary. FIG. 10 is a circuit diagram showing how multiple pixel structures of the type shown in FIG. 7A can share a common set of readout and RST2 transistors in accordance with some embodiments. As shown in FIG. 10, a first subpixel 34-1, a second subpixel 34-2, a third subpixel 34-3, and a fourth subpixel 34-4 can be coupled to a common (shared) floating diffusion node FD. The common floating diffusion node FD may be coupled to source follower transistor SF and row select transistor RS, sometimes referred to collectively as readout transistors. Four subpixels sharing a floating diffusion region and readout transistors in this way can help increase pixel density. As other examples, two or more subpixels each having one or more capacitor and at least two reset transistors can be coupled to a common FD node, three or more subpixels each having one or more capacitor and at least two reset transistors can be coupled to a common FD node, or more than four subpixels each having one or more capacitor and at least two reset transistors can be coupled to a common FD node.

Figure 11:
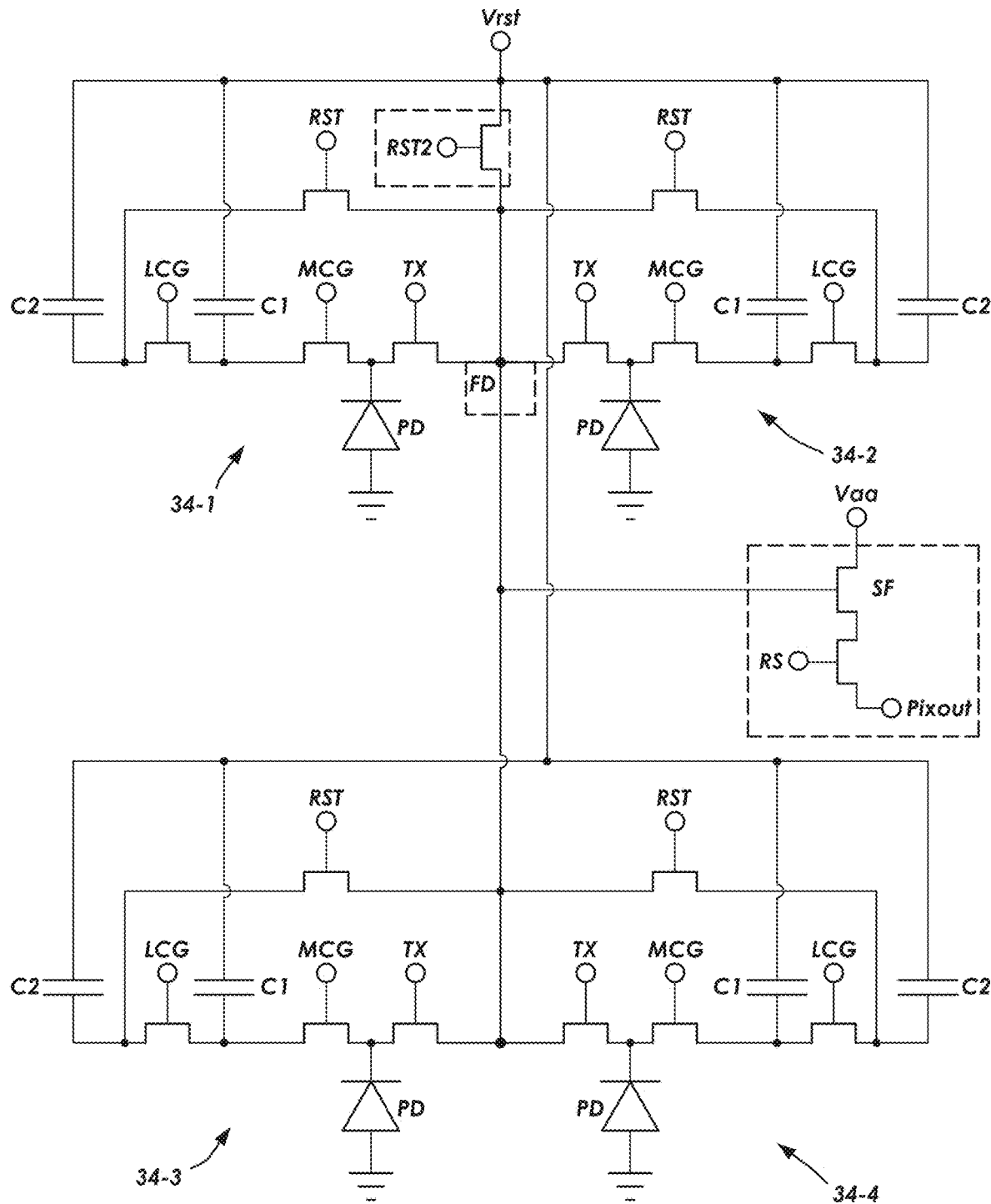
FIG. 11 is a circuit diagram showing how multiple pixel structures of the type shown in FIG. 8A can share readout and reset transistors in accordance with some embodiments.

The embodiment of FIG. 8A in which pixel 34 includes one photodiode PD is exemplary. FIG. 11 is a circuit diagram showing how multiple pixel structures of the type shown in FIG. 8A can share a common set of readout and RST2 transistors in accordance with some embodiments. As shown in FIG. 11, a first subpixel 34-1, a second subpixel 34-2, a third subpixel 34-3, and a fourth subpixel 34-4 can be coupled to a common (shared) floating diffusion node FD. The common floating diffusion node FD may be coupled to source follower transistor SF and row select transistor RS, sometimes referred to collectively as readout transistors. Four subpixels sharing a floating diffusion region and readout transistors in this way can help increase pixel density. As other examples, two or more subpixels each having two or more capacitor and at least two reset transistors can be coupled to a common FD node, three or more subpixels each having two or more capacitor and at least two reset transistors can be coupled to a common FD node, or more than four subpixels each having two or more capacitor and at least two reset transistors can be coupled to a common FD node.

Figure 12:
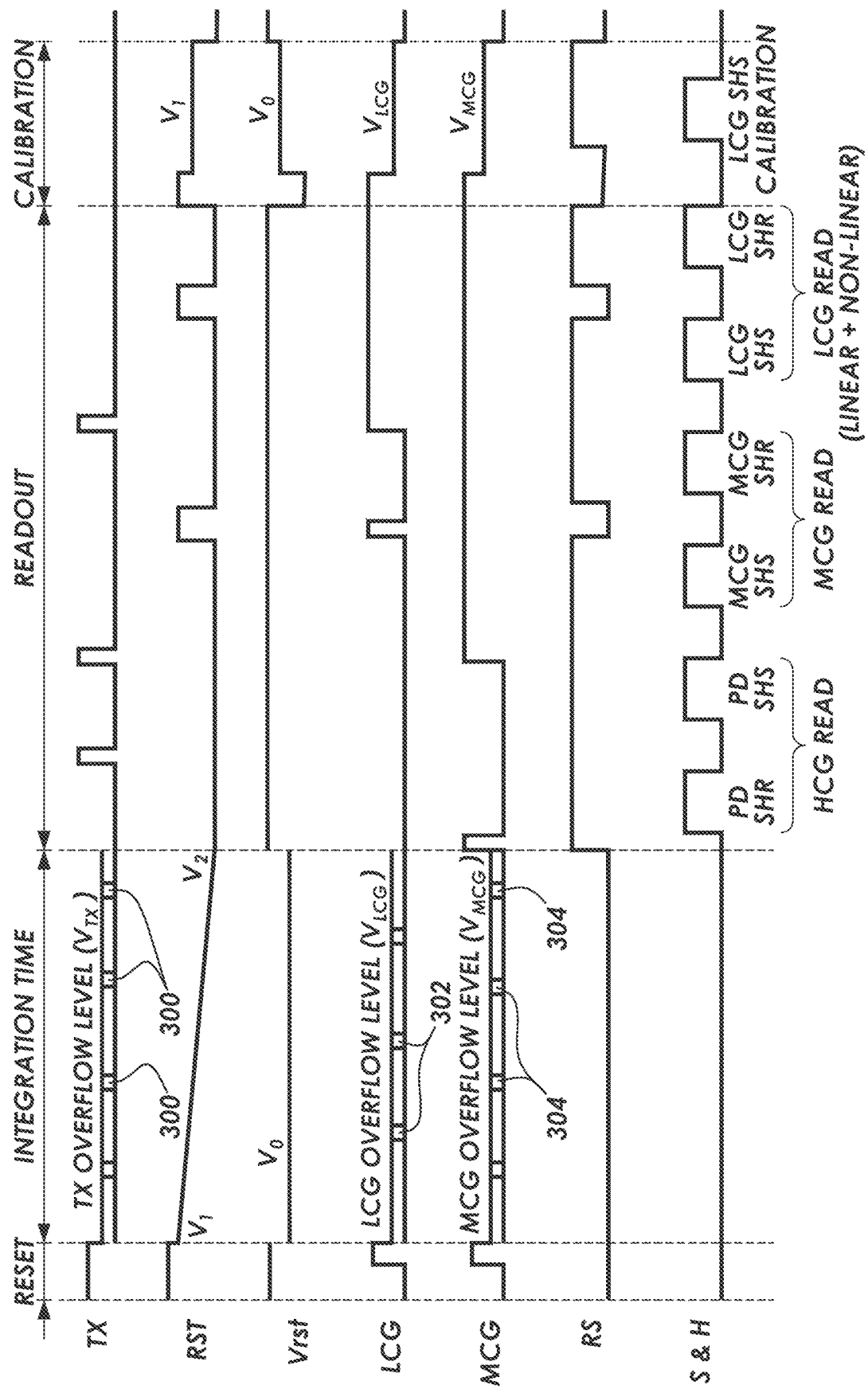
FIG. 12 is a timing diagram illustrating the operation of an image pixel in accordance with some embodiments.

FIG. 12 is a timing diagram illustrating the operation of image pixel 34 of the type described in connection with FIG. 6A in accordance with some embodiments. As shown in FIG. 12, image pixel 34 may be operable in (1) a reset phase, (2) an integration phase, (3) a readout phase, and optionally (4) a calibration phase. During the reset phase, the charge transfer control signal may be asserted (e.g., driven high) to activate transistor TX; the reset control signal may be asserted to activate transistor RST; the reset voltage Vrst may be driven to a high voltage level; the mode control signals can be pulsed high to activate the conversion gain transistors LCG and MCG; and transistor RS is deactivated.

During the integration phase, the charge transfer control signal reduced to a low potential level Vtx that would allow charge to overflow from the photodiode to the floating diffusion region. If desired, the charge transfer control signal can be held statically at the Vtx voltage level or pulsed one or more times to the Vtx voltage level during integration, as shown by pulses 300. The reset control signal can be lowered from voltage $V_1$ to voltage $V_2$. The example of FIG. 12 in which the reset control signal is ramped down linearly is illustrative. If desired, other ways of reducing the voltage of the reset control signal can be employed (see, e.g., FIG. 4).

During integration, the reset voltage Vrst can be adjusted to a voltage level $V_0$ that is optimized to reduce dark signal non-uniformity (DSNU). Dark signal can arise due to various factors such as thermal noise and leakage current. Dark signal non-uniformity is a measure of the non-uniformity or variation of dark signal levels among pixels in an image sensor. A higher DSNU value indicates a greater inconsistency in dark signal levels, whereas a lower DSNU value indicates a more uniform dark signal behavior. The low gain mode control signal modulating transistor LCG can be lowered to an LCG overflow voltage level $V_{LCG}$, whereas the middle gain mode control signal modulating transistor MCG can be lowered to an MCG overflow voltage level $V_{MCG}$. Here, the LCG overflow voltage level $V_{LCG}$ can be set greater than the TX overflow voltage Vtx, and the MCG overflow voltage level $V_{MCG}$ can be set greater than $V_{LCG}$. This is consistent with the potential diagram of FIG. 6B. If desired, the low gain mode control signal can be held statically at $V_{LCG}$ or pulsed one or more times to the $V_{LCG}$ voltage level during integration, as shown by pulses 302. Similarly, the middle gain mode control signal can be held statically at $V_{MCG}$ or pulsed one or more times to the $V_{MCG}$ voltage level during integration, as shown by pulses 304. The row select transistor can remain deactivated during the integration period.

The readout phase can include multiple readout operations. During a first high conversion gain or HCG readout period, a photodiode (PD) sample-and-hold reset (SHR) operation and a PD sample-and-hold signal (SHS) operation can be performed while both transistors LCG and MCG are deactivated. During the entirety of the HCG readout period, the row select transistor RS can be activated. Before the PD SHR operation, the middle conversion gain mode control signal can be pulsed high. After the PD SHR operation and before the PD SHS operation, the charge transfer control signal can be pulsed high to perform a charge transfer operation that allows accumulated charge to flow from photodiode PD to the floating diffusion region FD.

The HCG readout period can then be followed by a middle conversion gain or MCG readout period. During the MCG readout period, an MCG SHS operation and an MCG SHR operation can be performed while transistor MCG is activated. Before the MCG SHS operation, the charge transfer control signal can be pulsed high to temporarily activate transistor TX to perform a charge transfer operation that allows accumulated charge to flow from photodiode PD to the floating diffusion region FD. After the MCG SHS operation and before the MCG SHR operation, the reset control signal can be pulsed high to temporarily activate the reset transistor RST, the low conversion gain mode control signal can be pulsed high to temporarily activate transistor LCG, and the row select transistor RS can be temporarily turned off. The signal read out from the MCG SHS operation can include overflow charge stored using capacitor C1.

The MCG readout period can then be followed by a low conversion gain or LCG readout period. During the LCG readout period, an LCG SHS operation and an LCG SHR operation can be performed while both transistors MCG and LCG are activated. Before the LCG SHS operation, the charge transfer control signal can be pulsed high to temporarily activate transistor TX to perform a charge transfer operation that allows accumulated charge to flow from photodiode PD to the floating diffusion region FD. After the LCG SHS operation and before the LCG SHR operation, the reset control signal can be pulsed high to temporarily activate the reset transistor RST, and the row select transistor RS can be temporarily turned off. The signal read out from the LCG SHS operation includes overflow charge stored using both capacitors C1 and C2, which can include a linear portion and a non-linear portion for extended dynamic range if the signal exceeds the $V_1$ reset gate potential barrier.

During normal operation, voltage $V_1$ of the reset control signal can vary from pixel to pixel. Variation of the reset gate barrier can reduce signal-to-noise ratio (SNR) and can introduce fixed pattern noise or photo-response non-uniformity (PRNU) issues especially at very bright parts of the image. To remove this pixel-to-pixel variation, a calibration operation can be employed to calibration the $V_1$ barrier level on a per-pixel basis as part of each row readout. As shown in FIG. 12, an additional calibration phase can follow the readout phase. At the beginning of the calibration phase, the reset transistor RST can be completely activated, the reset voltage Vrst driven to a low voltage level, and the row select transistor RS deactivated.

During the calibration phase, the reset control signal can then be driven to voltage level $V_1$, the reset voltage Vrst driven to the DSNU optimized level that was used during integration, the low gain mode control signal driven to $V_{LCG}$ that was used during integration, the middle gain mode control signal driven to $V_{MCG}$ that was used during integration, and the row select transistor activated. With these conditions in place, an LCG SHS calibration operation can then be performed to obtain a $V_1$ potential reading for a selected pixel. This reading can then be used to realign multiple pixels to the same $V_1$ barrier level to compensate for any variability impact.

The example of FIG. 12 in which the calibration phase is used to calibrate the $V_1$ barrier level for the reset control signal is illustrative. If desired, a similar calibration operation can be employed to calibrate the $V_2$ barrier level for the reset control signal. If desired, the calibration phase for calibrating the $V_1$ and $V_2$ levels can be performed after each readout operation, one or more times at device power on, one or more times at a factory or laboratory, and/or periodically during the lifetime of the image sensor. Performing calibration in this way can be technically advantageous and beneficial to improve SNR and reduce fixed pattern noise for the image sensor device.

Figure 13:
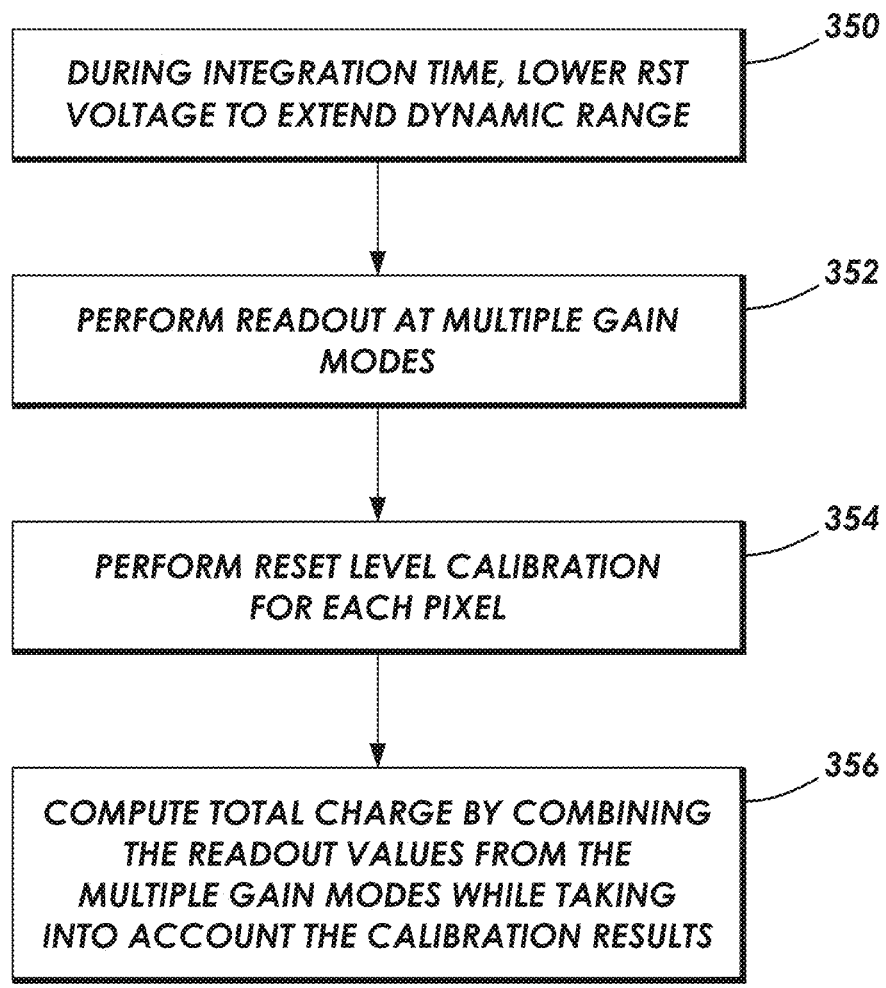
FIG. 13 is a flow chart of illustrative steps for operating one or more image pixels in an image sensor in accordance with some embodiments.

FIG. 13 is a flow chart of illustrative steps for operating one or more image pixels in an image sensor in accordance with some embodiments. Block 350 shows how during the integration phase, the voltage of the reset control signal can be lowered to extend the dynamic range of the image sensor. The reset control signal can be reduced in a stepwise fashion with one or more steps, a linear fashion, an exponential fashion, some variation of the ways shown in FIG. 4, or other discrete/continuous fashion. The operations of block 350 can be performed after a reset phase as shown in FIG. 12.

In the operations of block 352, one or more readouts can be performed at multiple gain modes. In the example of FIG. 12, a high gain mode (HCG) readout period, a middle gain mode (MCG) readout period, and a low gain mode (LCG) readout period can be performed in a sequential manner. This is merely illustrative. If desired, the HCG readout can be performed after the MCG readout or after the LCG readout. If desired, the MCG readout can be performed before the HCG readout or after the LCG readout. If desired, the LCG readout can be performed before the HCG readout or before the MCG readout. The readout operation shown in FIG. 12 might be used for pixels 34 having two capacitors and both LCG and MCG transistors. For pixels having only one capacitor and no MCG transistor (see, e.g., pixel 34 of FIG. 3A and FIG. 7A), the readout phase can omit the MCG readout period.

In the operations of block 354, a reset level calibration can be performed for each pixel. During this calibration phase, the $V_1$ voltage level and/or the $V_2$ voltage level of the reset control signal can be calibrated on a per-pixel basis. During calibration, the reset voltage Vrst and the control signals at the gate of the LCG and MCG transistors should be held at the same voltage level used during the integration phase.

In the operations of block 356, control circuitry such as circuitry 42 or 44 in FIG. 2 or circuitry 16 in FIG. 1 can compute a total charge or final readout signal by combining the readout values from the multiple gain modes while taking into account the calibration results. For example, the HCG readout operation can produce a first HCG readout value, the MCG readout operation (if performed) can produce a second MCG readout value, and the LCG readout operation can produce a third LCG readout value. The LCG readout value can include a linear signal portion obtained while the reset control signal is held at $V_1$ and a non-linear signal portion obtained while the reset control signal is being lowered from $V_1$ to $V_2$. At least the LCG readout value can be adjusted based on the calibration results. If desired, the MCG readout value can optionally be adjusted based on the calibration results. The final readout value can then be computed by combining the HCG readout value, the MCG readout value, and the adjusted/calibrated LCG readout value. Operating image pixel 34 in this way can be technically advantageous and beneficial to extend flicker-free and motion-artifact-free HDR performance many times such as from 120 dB to 140 dB or more across a wide range of operating temperatures without incurring large area cost.

The foregoing is merely illustrative and various modifications can be made to the described embodiments. The foregoing embodiments may be implemented individually or in any combination.

What is claimed is:

1. A method of operating an image sensor pixel, comprising:

accumulating charge in a photodiode;

during an integration phase, the accumulated charge in the photodiode overflowing into a capacitor coupled to a reset transistor having a gate terminal configured to receive a reset control signal; and during the integration phase, extending a dynamic range of the image sensor pixel by adjusting the reset control signal from a first voltage level to a second voltage level in accordance with a downward sloping voltage waveform.

2. The method of claim 1, wherein the downward sloping voltage waveform is linearly decreasing.

3. The method of claim 1, wherein the downward sloping voltage waveform is exponentially decreasing.

4. The method of claim 1, wherein a period of time during which the reset control signal is at the first voltage level is greater than a period of time during which the reset control signal is at the second voltage level during the integration phase.

5. The method of claim 1, wherein the charge stored in the capacitor represents a linear signal when the reset control signal is at the first voltage level and wherein additional charge stored in the capacitor when the reset control signal is adjusted from the first voltage level to the second voltage level represents a non-linear signal.

6. The method of claim 1, further comprising:
partially activating or fully activating a low conversion gain (LCG) transistor during the integration phase.

7. The method of claim 6, further comprising:
partially activating a middle conversion gain (MCG) transistor during the integration phase, wherein the LCG transistor is configured to receive a first gate voltage during the integration phase and wherein the MCG transistor is configured to receive a second gate voltage different than the first gate voltage during the integration phase.

8. The method of claim 6, further comprising:
during a readout phase, obtaining a high conversion gain (HCG) readout value and a low conversion gain (LCG) readout value; and
during a calibration phase subsequent to the readout phase, calibrating the first voltage level of the reset control signal.

9. The method of claim 8, further comprising:
during the integration phase, setting a gate voltage of the LCG transistor to a given voltage level that partially activates the LCG transistor; and
during the calibration phase, setting the reset control signal to the first voltage level and setting the gate voltage of the LCG transistor to the given voltage level.

10. An image sensor pixel comprising:
a photodiode;
a charge transfer transistor coupled between the photodiode and a floating diffusion node;
a reset transistor having a first source-drain terminal coupled to the floating diffusion node, a second source-drain terminal configured to receive a reset voltage, and a gate terminal configured to receive a reset control signal;
a capacitor directly coupled to the reset transistor and configured to receive overflow charge from the photodiode during an integration phase, wherein the reset control signal is dynamically adjusted during the integration phase to extend a dynamic range of the image sensor pixel; and
a low conversion gain (LCG) transistor coupled between the floating diffusion node and the reset transistor, wherein the LCG transistor is controlled by a gain control signal different than the reset control signal.

11. The image sensor pixel of claim 10, further comprising:
an additional capacitor having a first terminal configured to receive the reset voltage and having a second terminal; and
a middle conversion gain (MCG) transistor coupled between the floating diffusion node and the second terminal of the additional capacitor, wherein the MCG transistor is partially activated during the integration phase.

12. The image sensor pixel of claim 10, further comprising:
a middle conversion gain (MCG) transistor coupled between the floating diffusion node and the LCG transistor; and
an additional capacitor having a first terminal configured to receive the reset voltage and having a second terminal coupled to a node between the LCG transistor and the MCG transistor.

13. The image sensor pixel of claim 10, further comprising:
a middle conversion gain (MCG) transistor having a first source-drain terminal coupled to the photodiode and having a second source-drain terminal; and
an additional capacitor having a first terminal coupled to the second source-drain terminal of the MCG transistor and having a second terminal configured to receive the reset voltage.

14. The image sensor pixel of claim 10, wherein the reset control signal is lowered from a first voltage level to a second voltage level during the integration phase in a stepwise or continuous manner.

15. An image sensor pixel comprising:
a photodiode;
a charge transfer transistor coupled between the photodiode and a floating diffusion node;
a first reset transistor having a first source-drain terminal coupled to the floating diffusion node and a gate terminal configured to receive a reset control signal;
a second reset transistor having a first source-drain terminal coupled to the floating diffusion node and a second source-drain terminal configured to receive a reset voltage;
a capacitor directly coupled to a second source-drain terminal of the first reset transistor and configured to receive overflow charge from the photodiode during an integration phase;
a low conversion gain (LCG) transistor coupled between the photodiode and the second source-drain terminal of the first reset transistor; and
a middle conversion gain (MCG) transistor coupled between the photodiode and the LCG transistor.

16. The image sensor pixel of claim 15, wherein the reset control signal is ramped down from a first voltage level to a second voltage level during the integration phase to extend a dynamic range of the image sensor pixel.

17. The image sensor pixel of claim 15, further comprising:
an additional capacitor having a first terminal configured to receive the reset voltage and having a second terminal coupled to a node between the MCG transistor and the LCG transistor.

* * * * *